United States Patent
Fang et al.

(10) Patent No.: US 12,323,244 B2
(45) Date of Patent: Jun. 3, 2025

(54) ENHANCED REDUNDANCY OVER WI-FI FOR ULTRA-RELIABLE WIRELESS TIME-SENSITIVE NETWORKING

(71) Applicant: Intel Corporation, Santa Clara, CA (US)

(72) Inventors: Juan Fang, Portland, OR (US); Dave Cavalcanti, Portland, OR (US); Mikhail Galeev, Beaverton, OR (US); Anil Keshavamurthy, Portland, OR (US); Anil Kumar, Chandler, AZ (US); Susruth Sudhakaran, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 650 days.

(21) Appl. No.: 17/645,838

(22) Filed: Dec. 23, 2021

(65) Prior Publication Data
US 2022/0116146 A1  Apr. 14, 2022

(51) Int. Cl.
*H04L 1/08* (2006.01)
*H04L 12/46* (2006.01)
(Continued)

(52) U.S. Cl.
CPC ............ *H04L 1/08* (2013.01); *H04L 12/4645* (2013.01); *H04L 69/22* (2013.01); *H04W 84/12* (2013.01)

(58) Field of Classification Search
CPC ....................................................... H04L 1/08
See application file for complete search history.

(56) References Cited

U.S. PATENT DOCUMENTS

2014/0126415 A1* 5/2014 Shigei ................ H04L 45/24
370/389
2015/0381698 A1 12/2015 Mulcahy et al.
(Continued)

OTHER PUBLICATIONS

LAN/MAN Standards Committee, IEEE Standard for Local and metropolitan area networks—Frame Replication and Elimination for Reliability IEEE Std 802.1CB-2017, IEEE Standards Association (Year: 2017).*
(Continued)

*Primary Examiner* — Jason E Mattis
(74) *Attorney, Agent, or Firm* — Eversheds Sutherland (US) LLP

(57) ABSTRACT

This disclosure describes systems, methods, and devices related to using redundant frames for time-sensitive networking (TSN). A device may identify an Ethernet frame including a redundancy tag and an Internet Protocol (IP) packet; generate, based on the Ethernet frame, a first Wi-Fi frame including the redundancy tag and a sub-network access protocol (SNAP) header after an 802.11 medium access control (MAC) header and prior to the redundancy tag, the first Wi-Fi frame further including a first encapsulation of the IP packet; generate, based on the Ethernet frame, a second Wi-Fi frame including the redundancy tag and the SNAP header after the 802.11 MAC header and prior to the redundancy tag, the second Wi-Fi frame further including a second encapsulation of the IP packet; transmit the first Wi-Fi frame using a first Wi-Fi communication link; and transmit the second Wi-Fi frame using a second Wi-Fi communication link.

20 Claims, 17 Drawing Sheets

(51) Int. Cl.
*H04L 69/22* (2022.01)
*H04W 84/12* (2009.01)

(56) References Cited

U.S. PATENT DOCUMENTS

| | | | |
|---|---|---|---|
| 2016/0360565 A1* | 12/2016 | Li | H04W 76/10 |
| 2018/0206186 A1* | 7/2018 | Itagaki | H04W 16/14 |
| 2018/0212714 A1* | 7/2018 | Mori | H04L 69/324 |
| 2019/0059022 A1 | 2/2019 | Babaei | |
| 2021/0120552 A1* | 4/2021 | Fang | H04W 72/0446 |
| 2021/0266385 A1* | 8/2021 | Lu | H04L 69/04 |
| 2021/0306910 A1 | 9/2021 | Guo et al. | |
| 2021/0360650 A1 | 11/2021 | Huang | |
| 2022/0116146 A1 | 4/2022 | Fang et al. | |
| 2022/0210696 A1* | 6/2022 | Cavalcanti | H04W 28/06 |
| 2023/0199546 A1* | 6/2023 | Canpolat | H04L 1/08 370/329 |
| 2024/0195730 A1* | 6/2024 | Varga | H04L 45/24 |

OTHER PUBLICATIONS

International Preliminary Report on Patentability mailed Jul. 4, 2024 in Application No. PCT/US2022/050971, 6 pages.
International Search Report and Written Opinion mailed Apr. 19, 2023 in Application No. PCT/US2022/050971, 10 pages.

\* cited by examiner

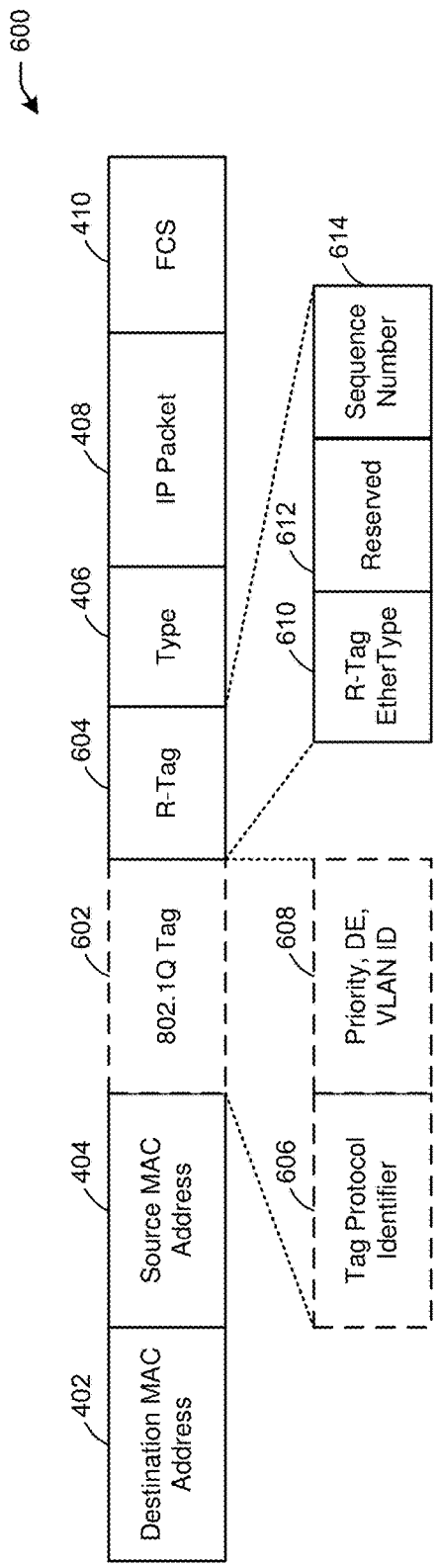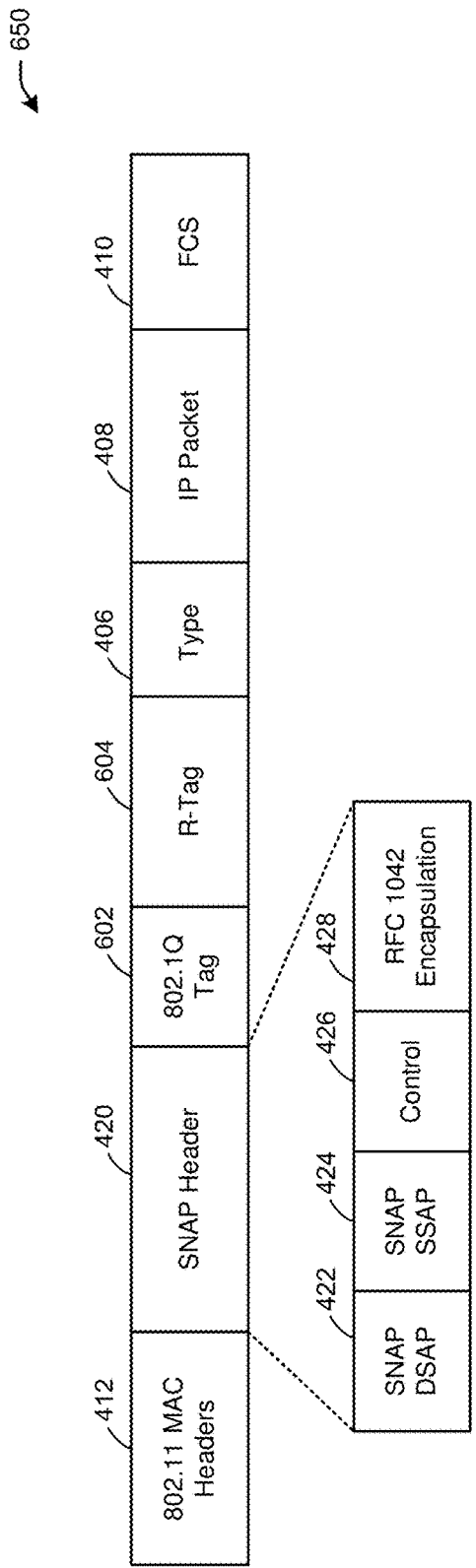
FIG. 6A
FIG. 6B

ENHANCED REDUNDANCY OVER WI-FI FOR ULTRA-RELIABLE WIRELESS TIME-SENSITIVE NETWORKING

TECHNICAL FIELD

This disclosure generally relates to systems and methods for wireless communications and, more particularly, to Wi-Fi redundancy for wireless time-sensitive networking.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

BRIEF DESCRIPTION OF THE DRAWINGS

FIG. 6A depicts a portion of an 802.3 frame format with encapsulation of an IP packet, in accordance with one or more aspects of the present disclosure.

FIG. 6B depicts a portion of an 802.11 frame format with encapsulation of an IP packet, in accordance with one or more aspects of the present disclosure.

DETAILED DESCRIPTION

Figure 1:
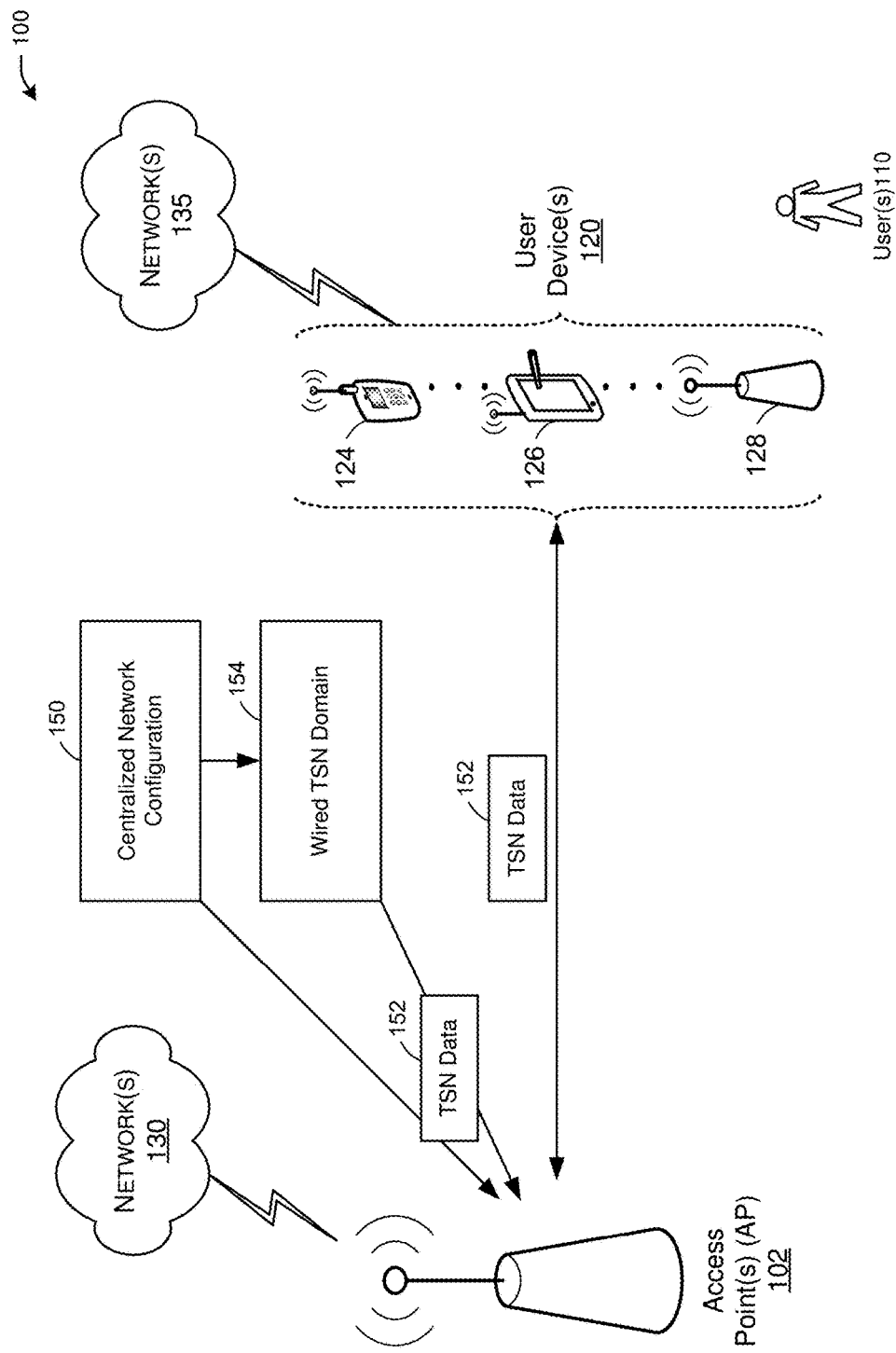
FIG. 1 is a network diagram illustrating an example network environment, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Time-sensitive networking (TSN) refers to networking protocols and standards developed under IEEE 802.1 TSN to provide delivery of data with minimal latency and zero congestion loss using local area networks (LANs). Current TSN standards have been developed using wired Ethernet connections as the communication medium for time-sensitive applications, such as industrial automation and connected autonomous cars. Recent efforts have included extending TSN operations over wireless communications, such as Wi-Fi as defined by the IEEE 802.11 family of standards. For example, 802.1AS time synchronization and 802.1Qbv time-aware scheduling capabilities may be implemented using Wi-Fi.

However, TSN redundancy is a concept that has not yet been enabled over 802.11 Wi-Fi communications. TSN redundancy may include sending the same packet multiple times using multiple redundant paths to ensure that the receiving device receives at least one of those packets quickly enough to satisfy low-latency and high-reliability application requirements. Currently, TSN redundancy does not exist using Wi-Fi wireless communication mediums. Frame replication and elimination for TSN Ethernet redundancy is defined in the 802.1CB standard to enable high-reliability in TSN. Extending TSN redundancy to Wi-Fi requires a way for receiving devices to identify when packets are redundant versions (e.g., so as to not respond to multiple packets including the same information), and what to do with redundant packets when they are received. Enabling Wi-Fi TSN redundancy may allow for the application of wireless communication technologies such as Wi-Fi to new applications such as software-defined machines and autonomous industrial systems and factories.

To enable redundancy for TSN applications in Ethernet-based networks, the 802.1CB, 802.1Qcc, and 802.1Qca standards need to operate jointly. A fully centralized configuration model, which is defined in 802.1Qbv, allows an all-knowing, centralized software controller to receive stream requirements from talkers and listeners, and to directly configure the relevant bridges to meet those requirements. 802.1Qca defines the path control and reservation, and working with the 802.1Qcc enables redundancy path selection and reservation from the talker to the listener based on the quality of service (QoS) requirements and network information reported from the end devices and the bridges. To indicate the selected path information for the frame forwarding, an 802.1Q tag with virtual LAN (VLAN) identifier information is inserted in an 802.3 Ethernet frame. As a result, when a relay or bridge receives a new frame, it can rely on the VLAN identifier information to identify the Ethernet port to which it should forward the received packet. 802.1CB specifies procedures, managed objects, and protocols for bridges and end stations that provide: 1) Identification and replication of frames, for redundant transmission; and 2) Identification and elimination of duplicate frames, for redundant reception. To identify duplicated frame, a redundancy tag with sequence number information is added in the medium access control (MAC) layer header of an 802.3 Ethernet frame. As a result, when the end device or the relay receives a new frame, it can rely on the destination MAC address and the sequence number information indicated in the redundancy tag to determine whether it is a frame it has received before. If it is a duplicated frame, the duplicated frame will be eliminated, and no further process will be initiated.

However, the current redundancy protocol is not able to extend redundancy capabilities to the wireless links for Wi-Fi. In particular, when the talker sends data to the listener over two redundant paths, and when the communication between the talker/listener and the bridge is happening over Wi-Fi, there is no solution to send or forward the Ethernet/Wi-Fi frame with a redundancy tag and VLAN tag information over Wi-Fi/Ethernet to the listener for packet elimination.

To carry redundant tag information, such as IP packets, 802.11 has defined encapsulation techniques and frame formats as described herein. To add such redundant tag information for duplicate Wi-Fi frames, a mechanism is needed to signal the redundancy so that Wi-Fi interfaces may identify frames as duplicates (i.e., part of a TSN redundancy scheme).

Some existing techniques have proposed a Layer-3 (e.g., the network layer of the Open Systems Interconnection—OSI—model stack) solution to enable frame replication and elimination for reliability (FRER) over Wi-Fi, however, the Layer-3 solution may not be used for TSN integration, which occurs at Layer-2 (e.g., the data link layer of the OSI stack). To integrate with wired TSN networks, a Layer-2 approach executed by 802.11 devices is needed.

There is therefore a need to extend TSN redundancy to Wi-Fi communications.

In one or more embodiments, the solution proposed in the present disclosure enables the talk/listener (T/L) connected with the bridge (B) over Wi-Fi to communicate with the bridge over multiple different channels. This solution may be implemented using a single Wi-Fi Network Interface (NIC), or dual Wi-Fi NICs. If a single NIC is used, multiple channel transmissions can be achieved through time-division and fast channel switching or through concurrent dual band communications, depending on the capabilities supported by the Wi-Fi hardware. If dual NICs are used, multiple links can be established simultaneously.

In an 802.11 data frame, there is a Sequence Control field for the sequence number information. However, the sequence number information is for point-to-point (e.g., link layer) transmission. A sequence number field for end-to-end frame replication and elimination is required over a Wi-Fi link in order to integrate the Wi-Fi/802.11 links as part of a broader TSN infrastructure that supports path redundancy based on the 802.1CB standard. Similar to Ethernet, 802.11 can transport any network-layer protocol. However, unlike Ethernet, 802.11 relies on 802.2 logical link control (LLC) encapsulation to carry higher-level protocols. Some existing techniques have defined a standard for transmission of Internet protocol (IP) datagrams over IEEE 802 networks. The encapsulation of the IP or address resolution protocol (ARP) in an 802.11 frame is defined by some existing techniques. In one or more embodiments, a sub-network access protocol (SNAP) header with the type field may inserted between the 802.11 MAC header and the IP packet.

In addition, the 802.11 standards have defined the IP, APR, VLAN-tagged IP, or VLAN-tagged ARP header encodings for EtherType protocol discrimination (EPD) and logical link control (LLC) protocol discrimination (LPD) as shown in Table 1 below.

TABLE 1

EPD and LPD Headers for MAC Service Data Units (MSDUs):

| Protocol | EPD MSDU Header | LPD MSDU Header |
| --- | --- | --- |
| Bridge Protocol Data Unit (BPDU) | Length-42-42-03 (where length is a 2-octet, big-endian, unsigned integer length in octets) | 42-42-03 |
| IPv4 | 08-00 | AA-AA-03-00-00-00-08-00 |
| IPv6 | 86-DD | AA-AA-03-00-00-00-08-DD |
| IP APR | 08-06 | AA-AA-03-00-00-00-08-06 |
| Intermediate System-Intermediate System (IS-IS) | Length-FE-FE-03 (where length is a 2-octet, big-endian, unsigned integer length in octets) | FE-FE-03 |
| C-VLAN tagged IPv4 (assuming C-VLAN ID xy-zw) | 81-00-xy-zw-08-00 | AA-AA-03-00-00-00-81-00-xy-zw-08-00 |
| S-VLAN (assuming S-VLAN ID st-uv) and C-VLAN (assuming C-VLAN ID xy-zw) tagged IPv6 | 88-A8-st-uv-81-00-xy-zw-86-DD | AA-AA-03-00-00-00-88-A8-st-uv-81-00-xy-zw-86-DD |

In one or more embodiments, the present disclosure may extend TSN redundancy over 802.11/Wi-Fi by including protocol enhancements for the 802.11/Wi-Fi stack. The present disclosure describes detailed implementation steps and minimal changes required in the 802.11 specification and implementation to enable encapsulation and translation of redundancy information between Ethernet and 802.11/Wi-Fi.

In one or more embodiments, a new LLC encapsulation option may include adding a SNAP header to an 802.11 frame that encapsulates an IP or APR address. The SNAP of Table 1 above may be modified as shown below in Table 2, which may be included in 802.11 standards (e.g., 802.11ak).

TABLE 2

Modified EPD and LPD Headers for MSDUs:

| Protocol | EPD MSDU Header | LPD MSDU Header |
|---|---|---|
| Bridge Protocol Data Unit (BPDU) | Length-42-42-03 (where length is a 2-octet, big-endian, unsigned integer length in octets) | 42-42-03 |
| IPv4 | 08-00 | AA-AA-03-00-00-00-08-00 |
| IPv6 | 86-DD | AA-AA-03-00-00-00-08-DD |
| IP APR | 08-06 | AA-AA-03-00-00-00-08-06 |
| Intermediate System-Intermediate System (IS-IS) | Length-FE-FE-03 (where length is a 2-octet, big-endian, unsigned integer length in octets) | FE-FE-03 |
| C-VLAN tagged IPv4 (assuming C-VLAN ID xy-zw) | 81-00-xy-zw-08-00 | AA-AA-03-00-00-00-81-00-xy-zw-08-00 |
| S-VLAN (assuming S-VLAN ID st-uv) and C-VLAN (assuming C-VLAN ID xy-zw) tagged IPv6 | 88-A8-st-uv-81-00-xy-zw-86-DD | AA-AA-03-00-00-00-88-A8-st-uv-81-00-xy-zw-86-DD |
| C-VLAN (assuming C-VLAN ID xy-zw) 802.1cb (assuming 802.1cb ID xx-xx-xx-xx) tagged IPv4 | 81-00-xy-zw-F1-C1-xx-xx-xx-xx-08-00 | AA-AA-03-00-00-00-81-00-xy-zw-F1-C1-xx-xx-xx-xx-08-00 | header may indicate that an EtherType protocol is used and may signal redundancy tag (R-tag) control information in the payload of an 802.11 frame. The R-tag may be defined as an HSR (highly-available seamlessly reliable), PRP (parallel redundancy protocol), or 802.1CB tag. The 802.11 EtherType translation between Ethernet/802.3 and 802.11 may be extended to process the new R-tag information and execute the required redundancy procedure defined by the redundancy protocol (e.g., the HSR, PRP, or 802.1cb). The TSN redundancy protocol may be extended to enable an interface to other 802 networks, such as 802.11 for Wi-Fi. QoS and high-reliability for time-critical applications may be enabled to co-exist with other best-effort network applications using a same edge node. The worst-case latency may be reduced through higher reliability, thereby enabling more stringent and demanding time-critical applications to be wireless.

In one or more embodiments, it may be assumed that a time-sensitive traffic stream exists from a talker to a listener. The present disclosure enables the extension of the frame duplication mechanism to Wi-Fi devices (e.g., talker, listener, bridge) to obtain over-the-air redundancy, as the talker or listener may send or receive data over different channels to or from the bridge.

In one or more embodiments, the R-tag information with R-tag EtherType ID (e.g., HSR EtherType) may be inserted with other EtherType tags after the SNAP header by setting the DSAP (destination SAP) and SSAP (source SAP) to be "AA" or "AB," and the OUI (organizationally unique identifier—identifying an organization, such as 802.11) to be "000000." In this manner, an 802.11 LPD frame may include an 802.11 MAC header (e.g., with frame control, device addresses, sequence control, and QoS control) followed by the SNAP header (e.g., with the SNAP and DSAP), followed by the 802.1Q tag, and the R-tag.

In one or more embodiments, the translation between Ethernet/802.3 and 802.11 may be extended for HSR, PRP, and 802.1CB protocols. The EPD and LDP protocol heading In one or more embodiments, the TSN redundancy protocol implementation for HSR, PRP, and 802.1CB may be extended to an interface for all 802 networks, such as 802.3 and 802.11. Because the existing HSR, PRP, and 802.1CB protocols were defined for Ethernet, they are implemented with an interface limitation that supports only Ethernet interfaces.

In one or more embodiments, a Wi-Fi device acting as a talker may be able to operate over multiple different channels simultaneously with multiple radios and within a single network interface (NIC), simultaneously with multiple NICs, or in series using channel switching with a single radio. When the talker device receives an Ethernet frame from the network stack, the device may perform TSN encapsulation to carry the R-tag in the 802.3 frame. Each frame in a compound stream may be assigned a sequence number sub-parameter value by a sequence generation function when the frame is passed down to the lower layers. In a stream splitting function, each frame may be replicated and given two stream handle sub-parameter values. The two different stream handles result in the two frames being assigned two different VLAN IDs. The sequence number encode/decode function may be responsible for inserting the sequence number sub-parameter into the frame and extracting the sub-parameter from the frame. The sequence number encode/decode function may encode the sequence number sub-parameter to the sequence number field of the R-tag information and fill the reserved field with zeroes. The sequence number encode/decode function may insert an EtherType and R-tag information as the first octets of the MSDU parameter after the 802.3 MAC header, thereby increasing the size of the MSDU parameters by six octets.

In one or more embodiments, based on the two different VLANs from the two different stream handles, the two duplicated frames may be passed down to two different 802.11 MAC layers by the IEEE 802.1ax link integration, simultaneously or in time-division based on whether the Wi-Fi device is able to operate at multiple channels at the same time. For example, there may be a mapping table between the VLAN ID and the service set (SS) ID in a Wi-Fi device.

In one or more embodiments, the LLC encapsulation/decapsulation may be responsible for R-tag encapsulation/decapsulation when an Ethernet frame is translated to/from an 802.11 frame. In the LLC encapsulation, for the Ethernet frame received from the upper layers, the first two octets of the MSDU following the 802.3 MAC header may be examined for equality with the R-tag EtherType. When the value is equal, the LLC encapsulation may perform the following processes: 1) Extract the first six octets of the MSDU after the 802.3 MAC header; 2) insert the SNAP header with the six octets R-tag with other EtherType tags, if needed, as the first octets of the MSDU parameter after the 802.11 MAC header in the 802.11 frame, thereby increasing the size of the MSDU parameters by six octets. The LLC encapsulation also may be responsible for identifying the IP, ARP, and VLAN tag and its translation from Ethernet frame to 802.11 frame.

In one or more embodiments, for the LLC decapsulation, when a newly received Wi-Fi packet is translated back to an Ethernet frame, the first two octets of the LLC header may be examined for equality with "AA" or "AB," and the OUI may be examined for equality with "000000." When the equalities exist, the first two octets of the MSDU following the LLC header may be examined for equality with the R-tag EtherType. When the R-tag is EtherType, the LLC decapsulation may perform the following processes: 1) Extract the first six octets of the MSDU after the 802.11 LLC header; and 2) insert the six octets of R-tag as the first octets of the MSDU parameter after the 802.3 MAC header in the generated Ethernet frame, ignoring the SNAP header, thereby decreasing the size of the MSDU parameters by six octets. The LLC decapsulation also may be responsible for identifying IP, APR, and VLAN tags and their translations from 802.11 frames to Ethernet frames.

In one or more embodiments, the sequence number encode/decode function may be responsible for inserting the sequence number sub-parameter into the frame and extracting it from the frame. After identifying a frame with an R-tag, the sequence number encode/decode function may remove the first six octets of the MSDU, shortening the size of the MAC payload by six octets. The sequence number field of the R-tag information may be copied to the sequence number sub-parameter, and the contents of the reserved field may be ignored. The sequence number sub-parameter extracted from the Ethernet frame with the destination MAC address may be used by the sequence recovery function for frame elimination. When the frame is a duplicate of another frame, based on the sequence number, the device may eliminate the duplicate frame from the sequence recovery function. Otherwise (i.e., not a duplicate), the frame may be forwarded to the upper layers.

In one or more embodiments, a Wi-Fi device operating as a relay may forward a frame received over an Ethernet connection to a next-hop device using Wi-Fi. When the Wi-Fi device receives the Ethernet frame, the device may perform TSN decapsulation, including stream identification, sequence decoding, and sequence recovery functions. The size of the MSDU of the Ethernet frame should be shortened by six octets after the TSN decapsulation. When the received frame is a duplicated frame, the sequence recovery function may eliminate the duplicated frame. Otherwise (i.e., not duplicated), the frame may be forwarded to the next-hop device using Wi-Fi after TSN encapsulation to allow for a Wi-Fi transmission. The TSN encapsulation may include the sequence number encode/decode function, the stream identification function, and LLC encapsulation.

In one or more embodiments, based on the VLAN ID, obtained from the MAC header of an Ethernet frame, and based on a mapping table between the VLAN ID and the SS ID, a Wi-Fi relay may forward the data frame to the next-hop device with the mapping SS ID. The mapping table may be similar to the mapping table between the VLAN ID and the Ethernet port number in any Ethernet device.

In one or more embodiments, when a Wi-Fi relay is able to operate over multiple different channels with multiple radios using a single NIC, simultaneously with multiple NICs, or in series by using channel switching with a single radio, the relay may replicate the received Ethernet frame and send the duplicated frames over two different channels through a stream splitting function, a sequence number encode/decode function, or stream identification function and IEEE 802.1ax link aggregation.

In one or more embodiments, a Wi-Fi relay may forward a frame received over Wi-Fi to a next-hop device over Ethernet. When the relay receives the Wi-Fi packet, the relay may perform LLC decapsulation and TSN decapsulation, including stream identification, sequence number encoding/decoding, and sequence recovery. In the LLC decapsulation, when the received Wi-Fi packet is translated back to the Ethernet frame, the first two octets of the LLC header may be examined for equality with "000000." When equal, the first two octets of the MSDU following the LLC header may be examined for equality with the R-tag EtherType. When the R-tag is EtherType, the LLC decapsulation may perform the following processes: 1) Extract the first six octets of the MSDU after the 802.11 LLC header, and may insert the six octet R-tag as the first six octets of the MSDU parameter after the 802.3 MAC header in the generated Ethernet frame and may ignore the SNAP header, thereby decreasing the size of the MSDU parameters by six octets.

In one or more embodiments, the sequence number encode/decode function for the relay may be responsible for inserting the sequence number sub-parameter into the frame and extracting the sequence number sub-parameter from the frame. After identifying a received frame with an R-tag, the first six octets of the MSDU may be removed, and the size of the MAC payload may be shortened by six octets. The sequence number field of the R-tag information may be copied to the sequence number sub-parameter and the contents of the reserved field may be ignored. The sequence number sub-parameter extracted from the Ethernet frame with the destination MAC address may be used by the sequence recovery function for frame elimination. When the frame is a duplicated frame, the sequence recovery may eliminate the frame, otherwise the frame may be forwarded to the next-hop device using Ethernet after TSN encapsulation, which may include the following processes: 1) Encoding the sequence number sub-parameter to the sequence number field of the R-tag information and filling the reserved field with zeroes; and 2) inserting an EtherType and R-tag information as the first octets of the MSDU parameter after the 802.3 MAC header, thereby increasing the size of the MSDU parameters by six octets. Based on the VLAN ID and a mapping table between the VLAN ID and the Ethernet port, the relay may forward the data frame to the next-hop device with the mapping Ethernet port number.

In one or more embodiments, Table 3 below may allow for the translation between an Ethernet frame and an 802.11 frame.

TABLE 3

Ethernet 802.3 to 802.11 Translation

| Protocol | Type/Length | LLC Header | 802.11 LLC Header |
|---|---|---|---|
| IP | 08-00 | — | AA-AA-03-00-00-00-08-00 |
| IP 802.3 | Length | AA-AA-03-00-00-00-08-00 | AA-AA-03-00-00-00-08-00 |
| IP ARP | 08-06 | — | AA-AA-03-00-00-00-08-06 |
| AppleTalk (1) | 80-9B | — | AA-AA-03-00-00-00-80-9B |
| AppleTalk (2) | Length | AA-AA-03-08-00-07-80-9B | AA-AA-03-08-00-07-80-9B |
| AppleTalk AARP (1) | 80-F3 | — | AA-AA-03-00-00-F8-80-F3 |
| AppleTalk AARP (2) | Length | AA-AA-03-00-00-00-80-F3 | AA-AA-03-00-00-00-80-F3 |
| IPX Ethernet II | 81-37 | — | AA-AA-03-00-00-F8-81-37 |
| IPX SNAP | Length | AA-AA-03-00-00-00-81-37 | AA-AA-03-00-00-00-81-37 |
| IPX 802.2 | Length | E0-E0-03 | E0-E0-03 |
| IPX 802.3 | Length | FF-FF | FF-FF |
| VLAN-tagged IP | 81-00 | 87-65-08-00 | AA-AA-03-00-00-00-81-00-87-65-AA-AA-03-00-00-00-08-00 |

In one or more embodiments, Table 4 below may allow for the translation between an 802.11 frame and an Ethernet frame.

TABLE 4

802.11 to Ethernet 802.3 Translation

| Protocol | 802.11 LLC Header | Type/Length | LLC Header |
|---|---|---|---|
| IP | AA-AA-03-00-00-00-08-00 | 08-00 | — |
| IP 802.3 | AA-AA-03-00-00-00-08-00 | Length | — |
| IP ARP | AA-AA-03-00-00-00-08-06 | 08-06 | — |
| AppleTalk (1) | AA-AA-03-00-00-00-80-9B | 80-9B | — |
| AppleTalk (2) | AA-AA-03-08-00-07-80-9B | Length | AA-AA-03-08-00-07-80-9B |
| AppleTalk AARP (1) | AA-AA-03-00-00-F8-80-F3 | 80-F3 | — |
| AppleTalk AARP (2) | AA-AA-03-00-00-00-80-F3 | Length | AA-AA-03-00-00-00-80-F3 |
| IPX Ethernet II | AA-AA-03-00-00-F8-81-37 | 81-37 | — |
| IPX SNAP | AA-AA-03-00-00-00-81-37 | Length | AA-AA-03-00-00-00-81-37 |
| IPX 802.2 | E0-E0-03 | Length | E0-E0-03 |
| IPX 802.3 | FF-FF | Length | FF-FF |
| VLAN-tagged IP | AA-AA-03-00-00-00-81-00-87-65-AA-AA-03-00-00-00-08-00 | 81-00 | 87-65-08-00 |

In one or more embodiments, when a relay has two Wi-Fi network interfaces, the relay may replicate the received Ethernet frame and send the two frames over two different network interfaces using stream splitting, sequence number encoding/decoding, stream identification, and 802.1ax link aggregation.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment 100, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 11:
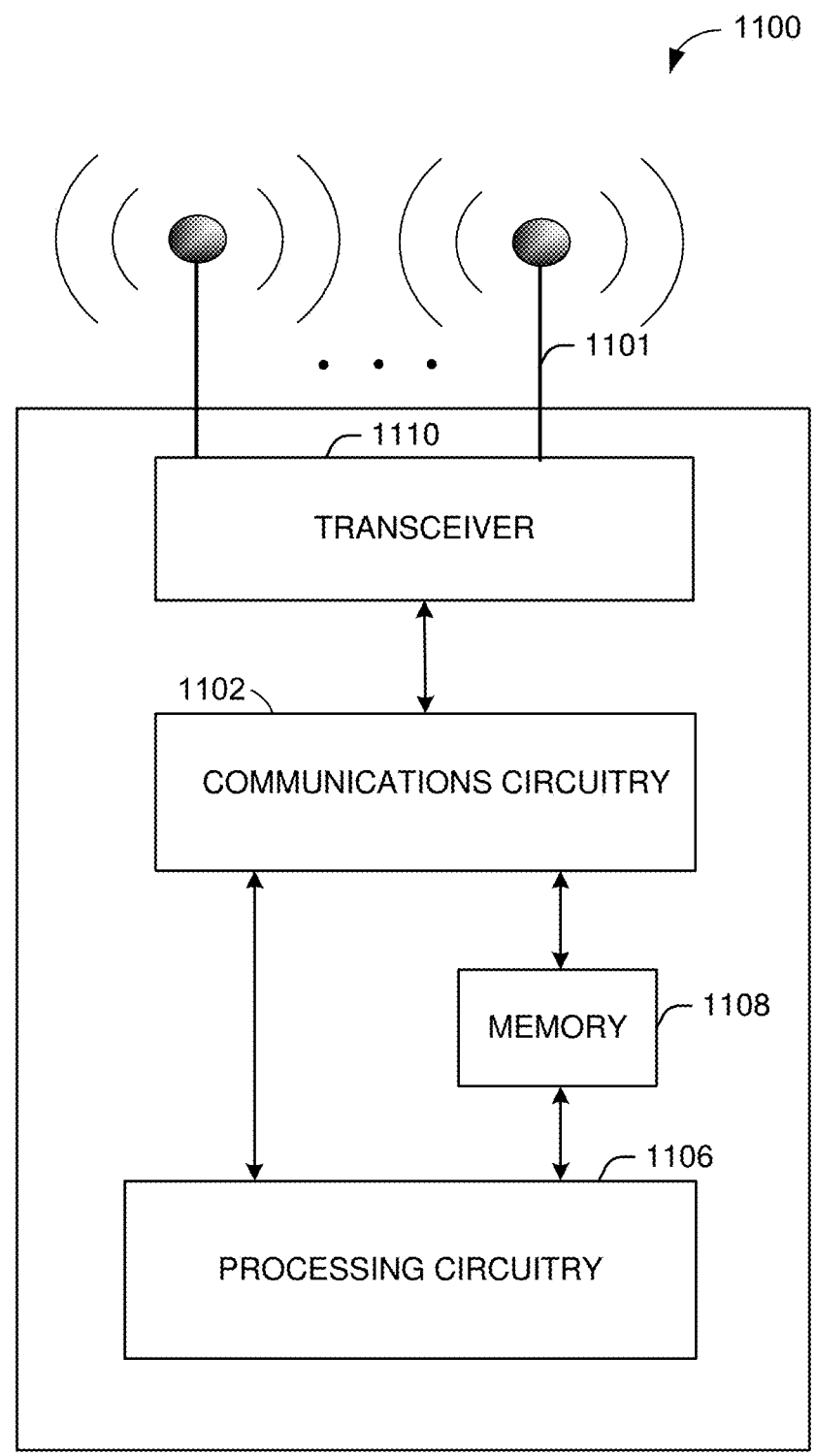
FIG. 11 illustrates a functional diagram of an exemplary communication station that may be suitable for use as a user device, in accordance with one or more example embodiments of the present disclosure.
Figure 12:
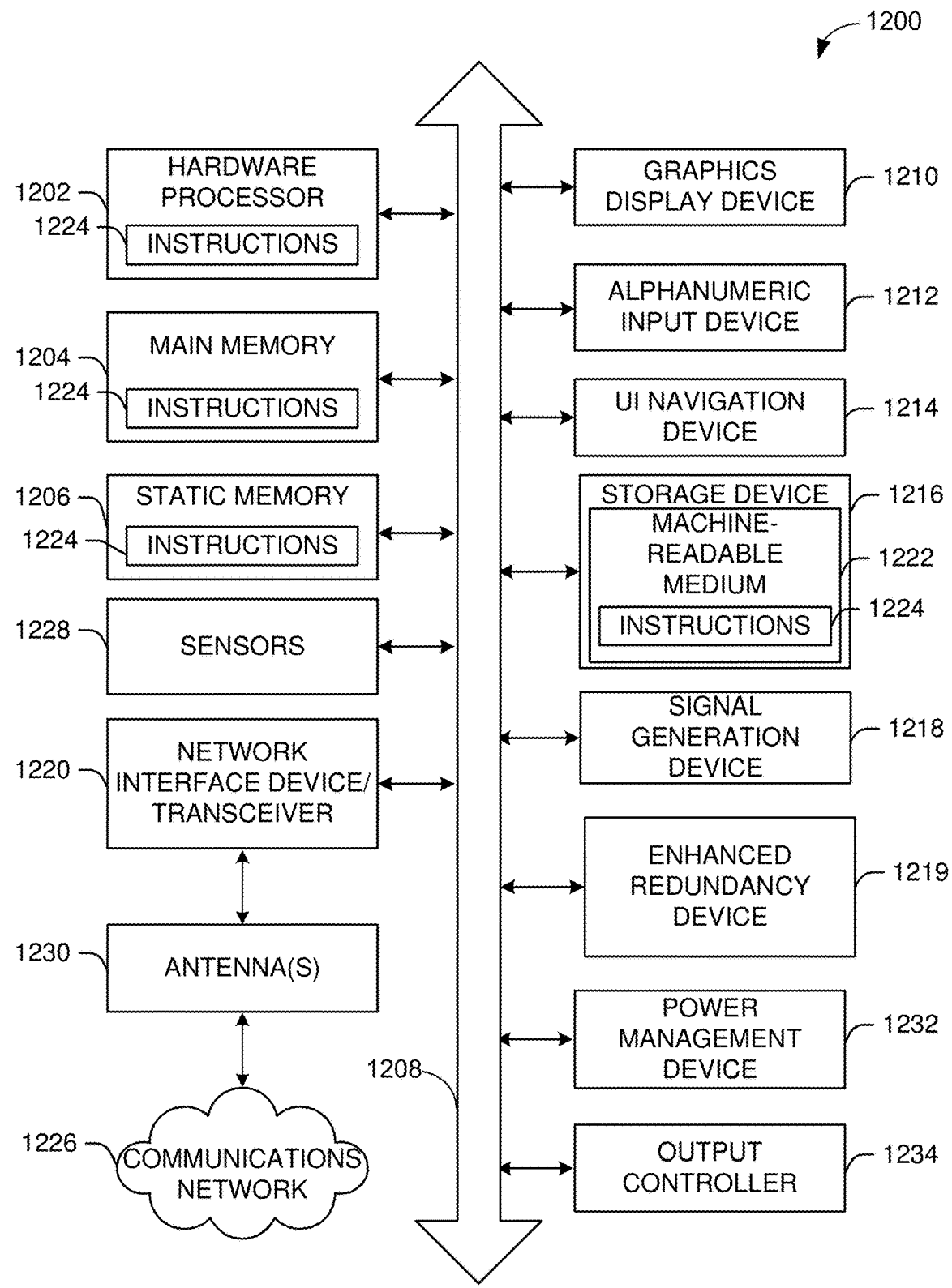
FIG. 12 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 11 and/or the example machine/system of FIG. 12.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), 60 GHZ channels (e.g. 802.11ad, 802.11ay, 802.11bf), and/or 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one or more embodiments, and with reference to FIG. 1, a centralized network configuration 150 may send TSN data 152 to the APs 102 and/or to a wired TSN domain 154 (e.g., Ethernet 802.3 domain). The APs 102 may receive the TSN data 152 from the centralized network configuration 150 or from the wired TSN domain 154, and may send the TSN data 152 to the user devices 120. The manner in which the TSN data is delivered using redundancy is described further herein.

It is understood that the above descriptions are for purposes of illustration and are not meant to be limiting.

Figure 2:
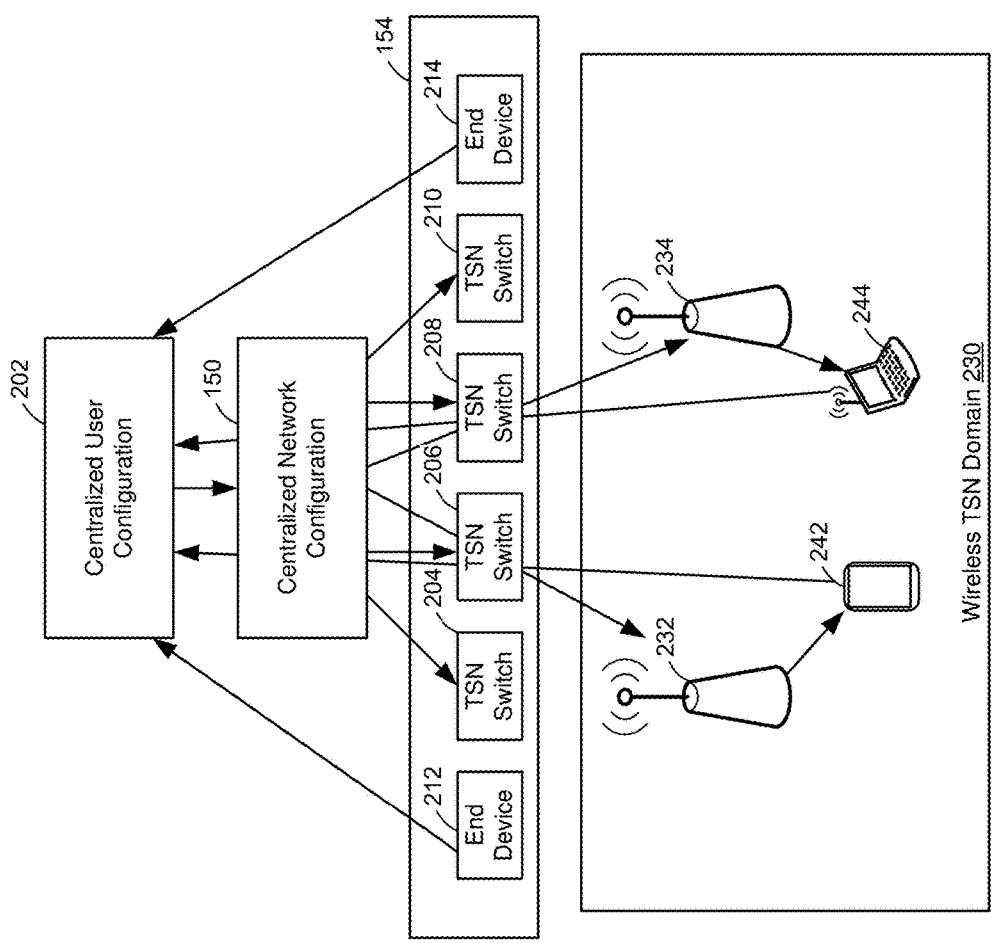
FIG. 2 illustrates a wireless time-sensitive networking centralized configuration environment, in accordance with one or more example embodiments of the present disclosure.

FIG. 2 illustrates a wireless TSN centralized configuration environment 200, in accordance with one or more example embodiments of the present disclosure.

Referring to FIG. 2, the centralized network configuration 150 of FIG. 1 may communicate with a centralized user configuration 202 as explained further below. The wired TSN domain 154 of FIG. 1 is shown in more detail, including TSN switches (e.g., TSN switch 204, TSN switch 206, TSN switch 208, TSN switch 210), and end devices (e.g., end device 212 and end device 214). A wireless TSN domain 230 may include APs (e.g., AP 232, AP 234) and STAs (e.g., end device 242, end device 244). The end devices of the TSN domain 154 and/or of the wireless TSN domain 230 may report QoS requirements and network interface information to the centralized user configuration 202, and the centralized user configuration 202 may provide the QoS requirements and network interface information to the centralized network configuration 150. The centralized network configuration 150 may facilitate central scheduling (e.g., stream identifiers, VLAN identifiers, path selection, forwarding tables, destination addresses, and the like), may check for errors, and may distribute the scheduling information to the TSN switches and APs.

Figure 3:
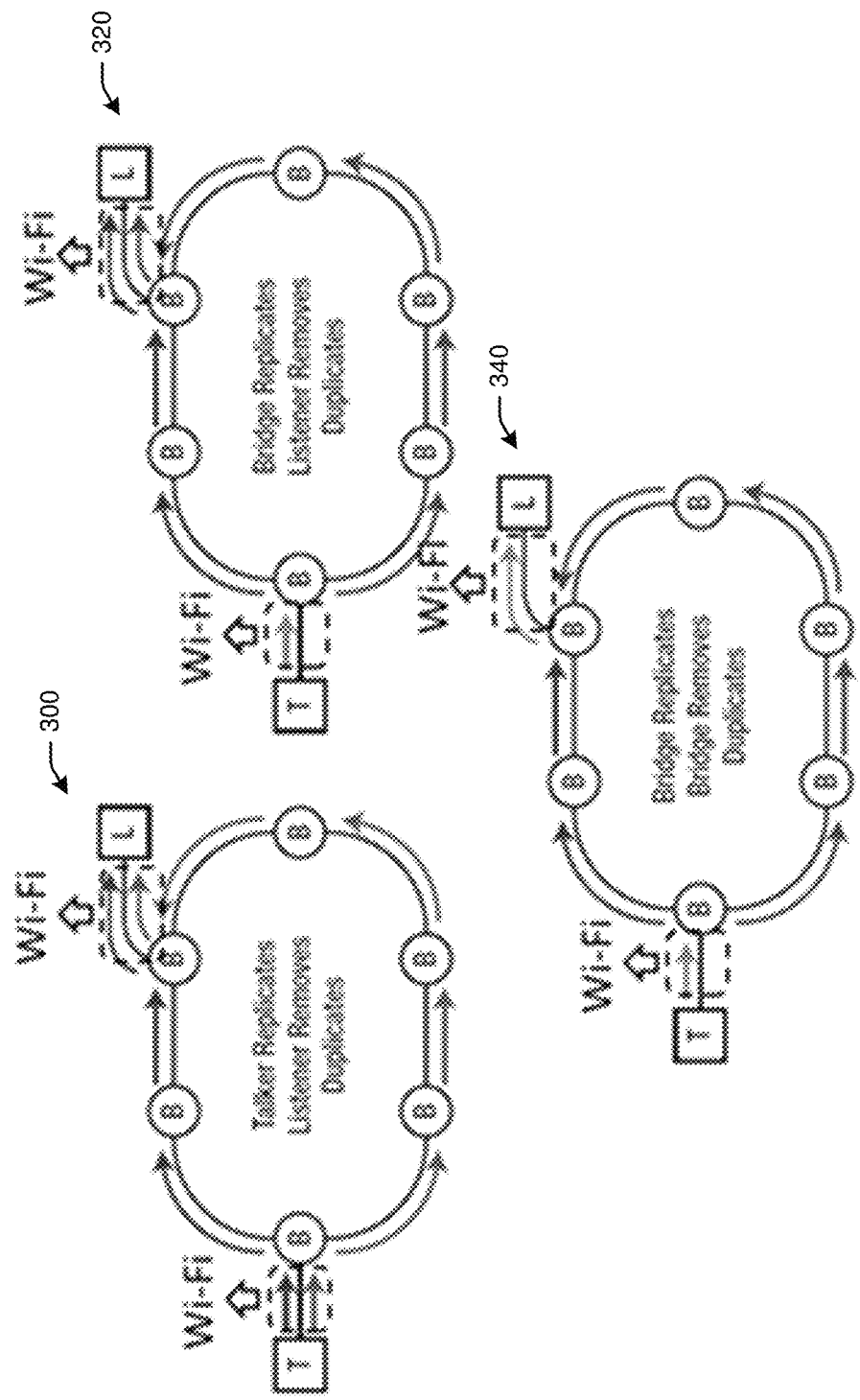
FIG. 3 illustrates end-to-end frame replication and elimination processes, in accordance with one or more aspects of the present disclosure.

FIG. 3 illustrates end-to-end frame replication and elimination processes, in accordance with one or more aspects of the present disclosure.

Referring to FIG. 3, a first end-to-end frame replication and elimination process 300 includes a talker device ("T" as shown) replicating a TSN frame (e.g., the TSN data 152 of FIG. 1) and sending the replicated data over two paths (e.g., the two sets of arrows shown). The listener device ("L" as show) may receive the duplicate TSN frames over the two paths, and may eliminate the second-received duplicate frame. A second end-to-end frame replication and elimination process 320 includes a talker device ("T" as shown) sending a TSN frame (e.g., the TSN data 152 of FIG. 1) to a bridge ("B" as shown). The bridge may replicate the TSN frame and send the replicated data over two paths (e.g., the two sets of arrows shown). The listener device ("L" as show) may receive the duplicate TSN frames over the two paths, and may eliminate the second-received duplicate frame. A third end-to-end frame replication and elimination process 340 includes a talker device ("T" as shown) sending a TSN frame (e.g., the TSN data 152 of FIG. 1) to a bridge ("B" as shown). The bridge may replicate the TSN frame and send the replicated data over two paths (e.g., the two sets of arrows shown). Another of the bridges (e.g., the bridge closest to the listener device "L" as shown) may receive the duplicate TSN frames over the two paths, and may eliminate the second-received duplicate frame. The remaining of the duplicate frames may be sent to the listener device L.

Figure 4:
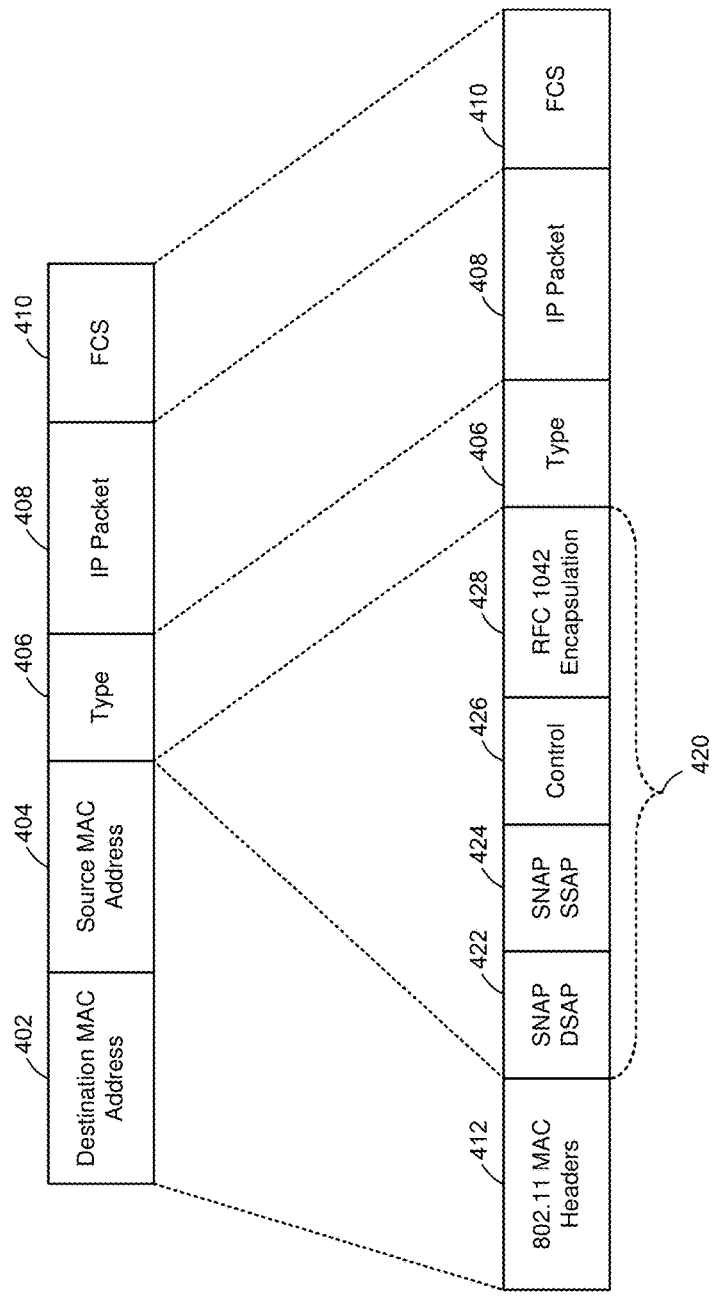
FIG. 4 depicts a portion of an 802.11 frame format with encapsulation of an Internet protocol (IP) packet, in accordance with one or more aspects of the present disclosure.

FIG. 4 depicts a portion 400 of an 802.11 frame format with encapsulation of an IP packet, in accordance with one or more aspects of the present disclosure.

Referring to FIG. 4, the portion 400 of an 802.11 frame may include a destination MAC address 402 (e.g., the MAC address of the device to which the 802.11 frame is sent), a source MAC address (e.g., the MAC address of the device sending the 802.11 frame), a protocol type 406 (e.g., indicating the type of packet encapsulation, such as IP or ARP), an IP packet 408 encapsulated in the 802.11 frame, and a frame check sequence (FCS) 410. The encapsulation of an IP or ARP in the 802.11 frame may result in an additional header being inserted between the destination and source MAC addresses and the type 406.

Still referring to FIG. 4, the destination MAC address 402 and the source MAC address 404 are shown within 802.11 MAC headers 412. Between the 802.11 MAC headers 412 and the type 406 (e.g., protocol type), a SNAP header 420 may be inserted with six octets, including a SNAP DSAP sub-field 422, a SNAP SSAP sub-field 424, a control sub-field 426, and an RFC 1042 encapsulation sub-field 428, prior to the protocol type 406. In this manner, 802.11 relies on encapsulation of IP packets, and lacks a way to signal when the encapsulated IP packet is redundant.

Figure 5:
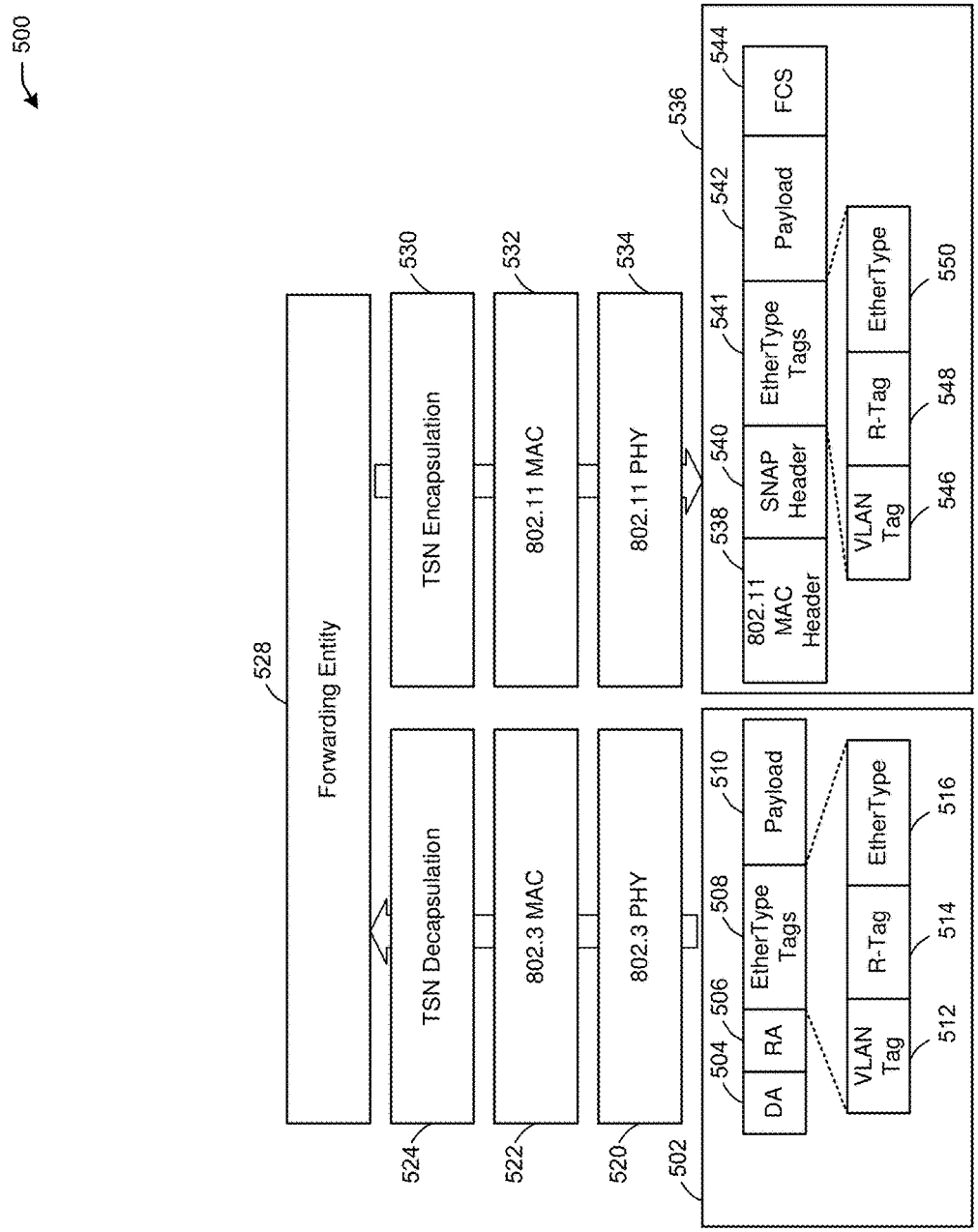
FIG. 5 depicts a communication stack for time-sensitive networking redundancy from Ethernet communications to 802.11 communications, in accordance with one or more aspects of the present disclosure.

FIG. 5 depicts a communication stack 500 for time-sensitive networking redundancy from Ethernet communications to 802.11 communications, in accordance with one or more aspects of the present disclosure.

Referring to FIG. 5, the communication stack 500 may receive or generate an Ethernet frame 502 having a destination address (DA—the final destination) 504, a receiver address (RA—the immediate receiver) 506, EtherType tags 508, and a payload 510. The EtherType tags 508 may include a VLAN tag 512, an R-Tag 514, and an EtherType protocol 516 indicator. The Ethernet frame 502 may be received at an 802.3 PHY layer 520, and sent up to an 802.3 MAC layer 522, to a TSN decapsulation layer 524 (e.g., where the R-Tag 514 may be extracted), and to a forwarding entity 526.

Still referring to FIG. 5, the forwarding entity 526 may send the Ethernet frame 502, with the extracted R-Tag 514, to a TSN encapsulation layer 530 (e.g., where an R-Tag may be inserted). The Ethernet frame 502 may be sent to an 802.11 MAC layer 532 (e.g., where LLC encapsulation may occur, as shown in FIG. 4), then sent to an 802.11 PHY layer 534 (e.g., to be transmitted as an 802.11 frame 536). To generate the 802.11 frame 536 from the Ethernet frame 502, an 802.11 MAC header 538 (e.g., with source and destination MAC addresses) may be followed by a SNAP header 540 (e.g., as shown in FIG. 4), EtherType tags 541, a payload 542, and a FCS 544. The EtherType tags 541 may include a VLAN tag 546, an R-Tag 548, and an EtherType protocol 550 indicator.

In one or more embodiments, when the 802.11 frame 536 is a redundant frame (e.g., duplicate) for TSN operations, the R-Tag 548 may be inserted and signaled by setting the DSAP (e.g., the SNAP DSAP 422 of FIG. 4) and the SSAP (e.g., the SNAP SSAP 424 of FIG. 4) of the SNAP header 540 to "AA" or "AB," and by setting an OUI (e.g., the control 426 of FIG. 4) of the SNAP header 540 to "000000."

FIG. 6A depicts a portion 600 of an 802.3 frame format with encapsulation of an IP packet, in accordance with one or more aspects of the present disclosure.

Referring to FIG. 6A, the portion 400 of FIG. 4 is shown with an optional 802.1Q Tag 602 and an R-Tag 604 inserted between the source MAC address 404 and the type 406. The optional 802.1Q Tag 602 may include a tag protocol identifier 606 and a priority sub-field 608. The R-Tag 604 may include an R-Tag EtherType 610, a reserved field 612, and a sequence number 614, for a total of six octets. In this manner, the portion 600 represents the portion 400 with the additional optional 802.1Q Tag 602 and R-Tag 604 (e.g., an 802.1cb tag).

FIG. 6B depicts a portion 650 of an 802.11 frame format with encapsulation of an IP packet, in accordance with one or more aspects of the present disclosure.

Referring to FIG. 6B, the portion 400 of FIG. 4 is shown with the 802.1Q Tag 602 and the R-Tag 604 of FIG. 6A inserted after the SNAP header 420 (e.g., the 802.1Q Tag 602 and the R-Tag 604 of the Ethernet frame may be included in the 802.11 frame that encapsulates the IP packet that was carried by the Ethernet frame). The R-Tag 654 may be included by setting the SNAP DSAP 422 and the SNAP SSAP 424 to "AA" or "AB," and by setting the control 426 (e.g., the OUI indicator) to "000000."

Figure 7:
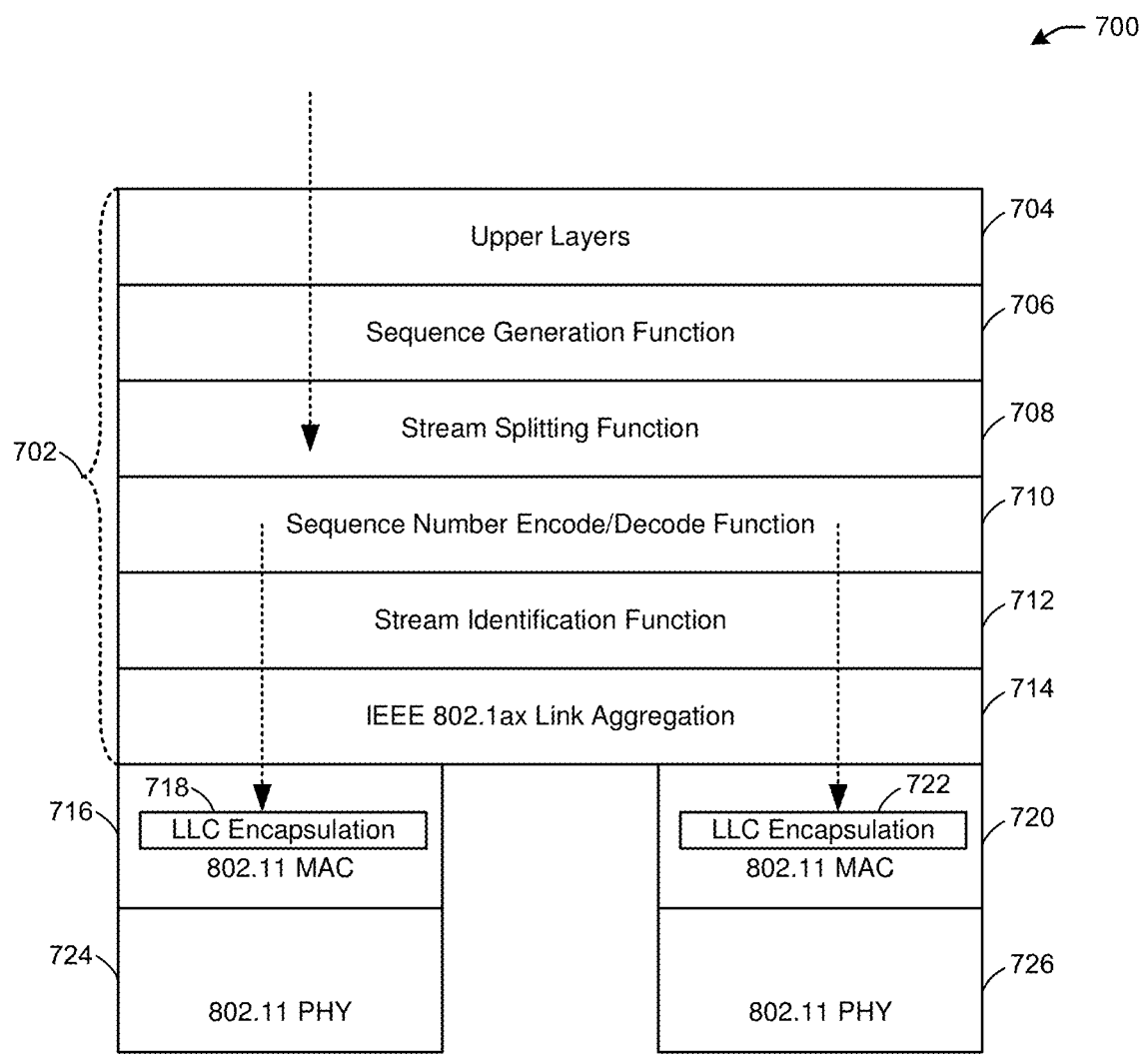
FIG. 7 depicts a protocol stack for time-sensitive networking redundancy for a talker device, in accordance with one or more aspects of the present disclosure.

FIG. 7 depicts a protocol stack 700 for TSN redundancy for a talker device, in accordance with one or more aspects of the present disclosure.

Referring to FIG. 7, the protocol stack 700 may include TSN encapsulation 702, including upper layers 704 (e.g., which may receive frames from a network stack, not shown), a sequence generation function 706, a stream splitting function 708, a sequence number encode/decode function 710, a stream identification function 712, and IEEE 802.1ax link aggregation 714. The stream splitting function 708 may split each frame (e.g., the dotted arrow from the upper layers 704 as shown) may be replicated (e.g., into the two dotted arrows at the sequence number encode/decode function 710) and given two stream handle sub-parameter values. The two different stream handles result in the two frames being assigned two different VLAN IDs. The sequence number encode/decode function 710 may be responsible for inserting the sequence number sub-parameter into the frame and extracting the sub-parameter from the frame. The sequence number encode/decode function 710 may encode the sequence number sub-parameter to the sequence number field of the R-tag information and fill the reserved field with zeroes. The sequence number encode/decode function 710 may insert an EtherType and R-tag information as the first octets of the MSDU parameter after the 802.3 MAC header (e.g., as shown in FIG. 6A), thereby increasing the size of the MSDU parameters by six octets.

Still referring to FIG. 7, a first stream of the duplicate streams generated by the stream splitting function 708 may be sent to an 802.11 MAC layer 716, where LLC encapsulation 718 (e.g., FIG. 4) may be performed, and then sent to an 802.11 PHY layer 724 (e.g., for transmission using a Wi-Fi medium). Similarly, a second stream of the duplicate streams generated by the stream splitting function 708 may be sent to an 802.11 MAC layer 720, where LLC encapsulation 722 (e.g., FIG. 4) may be performed, and then sent to an 802.11 PHY layer 726 (e.g., for transmission using a Wi-Fi medium).

In one or more embodiments, the protocol stack 700 may be included in a talker end system device.

Figure 8:
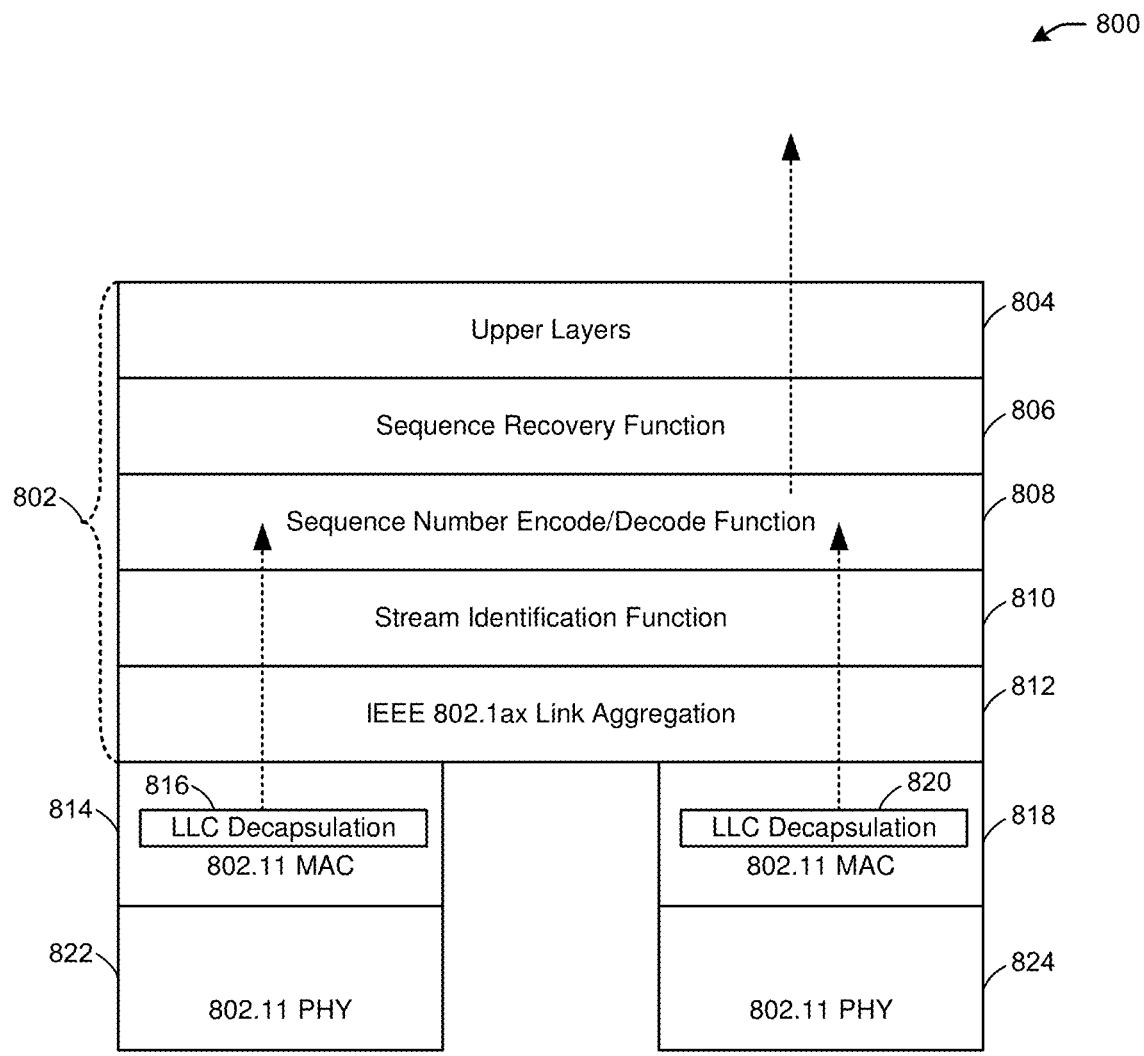
FIG. 8 depicts a protocol stack for time-sensitive networking redundancy for a listener device, in accordance with one or more aspects of the present disclosure.

FIG. 8 depicts a protocol stack 800 for TSN redundancy for a listener device, in accordance with one or more aspects of the present disclosure.

Referring to FIG. 8, the protocol stack 800 may include receiving two redundant streams (e.g., the two arrows from the MAC layers as shown) and performing TSN decapsulation 802. The TSN decapsulation 802 may include upper layers 804, a sequence recovery function 806, a sequence number encode/decode function 808, a stream identification function 810, and an IEEE 802.1ax link aggregation 812. A first of the two redundant streams may be received from an 802.11 MAC layer 814, which may perform LLC decapsulation 816. A second of the two redundant streams may be received from an 802.11 MAC layer 818, which may perform LLC decapsulation 820. The protocol stack 800 also may include an 802.11 PHY layer 822 and an 802.11 PHY layer 824.

In one or more embodiments, the LLC decapsulation 816 and 820 may include translating received Wi-Fi packets (e.g., the two arrows as shown, using 802.11 frames using the encapsulation shown in FIG. 4) back to an Ethernet frame (e.g., the top arrow as shown, using the format shown in FIG. 6A), the first two octets of the LLC header (e.g., SNAP header of FIG. 6B) of the Wi-Fi packet may be examined for equality with "AA" or "AB", and the OUI will be examined for equality with "000000." If they are equal, the first two octets of the MSDU following the LLC header (e.g., the 802.1Q Tag of FIG. 6B) may be examined for equality with the redundancy tag EtherType. If the redundancy tag EtherType is present, the LLC decapsulation 816 and 820 may perform the following processes: 1) Extract the first six octets of the MSDU after the 802.11 LLC header (e.g., the R-Tag), and 2) insert the six octets of the redundancy tag as the first octets of the MSDU parameter after the 802.3 MAC header in the generated Ethernet frame (e.g., as shown in FIG. 6A) and do not include the SNAP header in the Ethernet frame, thus decreasing the size of the MSDU parameters by six octets.

In one or more embodiments, the protocol stack 800 may be included in a listener end system device.

Figure 9:
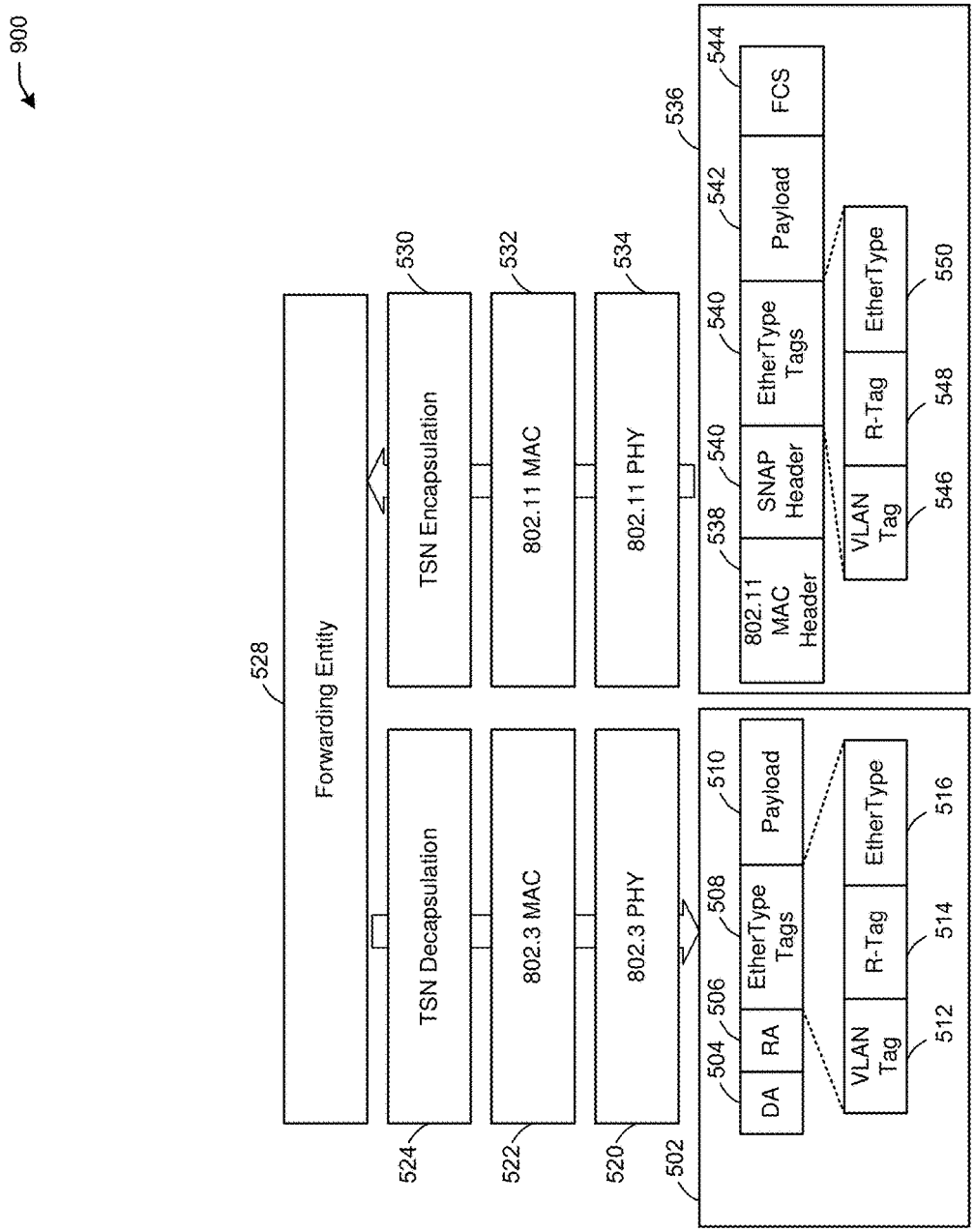
FIG. 9 depicts a communication stack for time-sensitive networking redundancy from 802.11 communications to Ethernet communications, in accordance with one or more aspects of the present disclosure.

FIG. 9 depicts a communication stack 900 for TSN redundancy from 802.11 communications to Ethernet communications, in accordance with one or more aspects of the present disclosure. Whereas FIG. 5 shows a conversion of an Ethernet frame into a Wi-Fi frame, FIG. 9 shows a conversion of a Wi-Fi frame into an Ethernet frame.

Referring to FIG. 9, the communication stack 900 generates or receives the 802.11 frame 536 of FIG. 5, which may be sent up the 802.11 PHY layer 534, the 802.11 MAC layer 532 (e.g., where LLC encapsulation occurs as shown in FIG. 4), the TSN encapsulation layer 530 (e.g., where the R-Tag is extracted), to the forwarding entity 528, and down the TSN decapsulation layer 524 (e.g., where the R-Tag is inserted), the 802.3 MAC layer 522, and the 802.3 PHY layer 520, where the Ethernet frame 502 may be sent over an Ethernet link.

In one or more embodiments, in the LLC encapsulation, when the 802.11 frame 536 is translated to the Ethernet frame 502, the first two octets of the LLC header (e.g., the DSAP and SSAP values of FIG. 6B) may be examined for equality with "AA" or "AB," and the OUI (e.g., of the control value of FIG. 6B) will be examined for equality with "000000." If they are equal, the first two octets of the MSDU following the LLC header (e.g., the tag protocol identifier 606 of the 802.1Q tag 602 of FIG. 6A) may be examined for equality with the redundancy tag EtherType. If it is equal, the LLC decapsulation may perform the following processes: 1) Extract the first six octets of the MSDU after the 802.11 LLC header (e.g., the R-Tag), and 2) insert the six octet redundancy tag as the first octets of the MSDU parameter after the 802.3 MAC header in the generated Ethernet frame, without including the SNAP header in the Ethernet frame 502, thus decreasing the size of the MSDU parameters by six octets.

In one or more embodiments, the sequence number encode/decode function of FIGS. 7 and 8 may be responsible for inserting the sequence number sub parameter into the frame and extracting from the frame. After identifying a frame with a redundancy tag, the first six octets of the MSDU may be removed, and the size of the MAC payload may be shorted by six octets. The Sequence Number field of the Redundancy tag information may be copied to the sequence number sub-parameter, and the contents of the reserved field may be ignored (e.g., FIG. 6A).

In one or more embodiments, the sequence number sub-parameter extracted from the Ethernet frame 502 with the destination MAC address may be used by the sequence recovery function of FIGS. 7 and 8 for frame elimination. If a frame is a duplicated frame, the duplicate may be eliminated by the Sequence recovery function, otherwise, the frame may be forwarded to the next hop device (e.g., a relay is connected to the next hop device with Ethernet) over Ethernet after the TSN encapsulation, which may include the following procedures: 1) Encoding the sequence number sub-parameter to the Sequence Number field of the redundancy tag information and filling the Reserved field with zeros, and 2) inserting an EtherType and Redundancy tag information as the first octets of the MSDU parameter after the 802.3 MAC header, thus increasing the size of the MSDU parameters by six octets (e.g., FIG. 6A).

In one or more embodiments, the communication stack 900 may be implemented by a relay device that receives an 802.11 frame and converts it to an Ethernet frame to be sent over an Ethernet link.

Figure 10A:
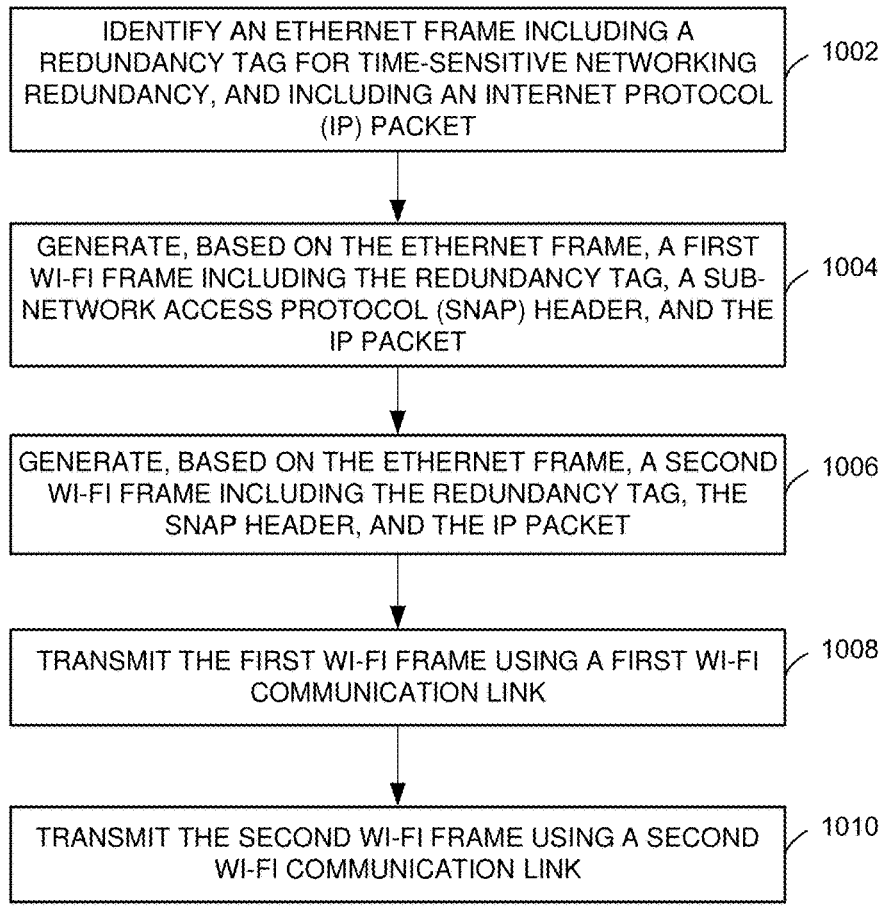
FIG. 10A illustrates a flow diagram of illustrative process for wireless time-sensitive networking redundancy operations, in accordance with one or more example embodiments of the present disclosure.

FIG. 10A illustrates a flow diagram of illustrative process 1000 for wireless time-sensitive networking redundancy operations, in accordance with one or more example embodiments of the present disclosure.

At block 1002, a device (e.g., a talker or relay device, such as shown in FIG. 3, the TSN switches of FIG. 2, the APs of FIG. 2) may identify an Ethernet frame (e.g., an 802.3 frame, such as the Ethernet frame 502 of FIG. 5), which may be received over an Ethernet communication link (e.g., from another device, in which case the device of block 1002 may be a relay device) or may be generated by the device (e.g., in which case the device of block 1002 may be a talker device). The Ethernet frame may include an IP packet (e.g., as shown in FIG. 6B), along with an R-Tag that indicates an EtherType protocol and that the Ethernet frame may be used for redundant transmissions for TSN operations.

At block 1004, the device may generate a first Wi-Fi frame based on the Ethernet frame having the R-Tag for TSN operations. The Wi-Fi frame may be the first of two duplicate Wi-Fi frames generated by the device so that the device may send both Wi-Fi frames as duplicates. In particular, at block 1006, the device may generate a second Wi-Fi frame that is the second of the duplicate Wi-Fi frames. To signal that the Wi-Fi frames are duplicates of one another, the device may extract the R-Tag from the Ethernet frame and include the R-Tag with a SNAP header in each of the duplicate Wi-Fi frames. To signal that the Wi-Fi frames are part of a duplicate sequence, the device may generate a sequence number to be included (e.g., as shown in FIGS. 6A and 6B), and may generate different VLAN identifiers for the respective duplicate frames (e.g., the duplicate frames may carry duplicate information, but the VLAN identifiers used for the different communication streams used to send the frames may be different from one another). Further description regarding the recognition of the Ethernet frame and generation of the duplicate Wi-Fi frames based on the Ethernet frame is provided with respect to FIGS. 5 and 7.

At block 1008, the device may transmit the first Wi-Fi frame using a first Wi-Fi communication link. At block 1010, the device may transmit the second Wi-Fi frame using a second Wi-Fi communication link. Examples of the duplicate transmissions are shown in FIG. 3, in which the talker device T or the bridge device B (e.g., a relay device) may generate the duplicate frames and send them over two paths.

Figure 10B:
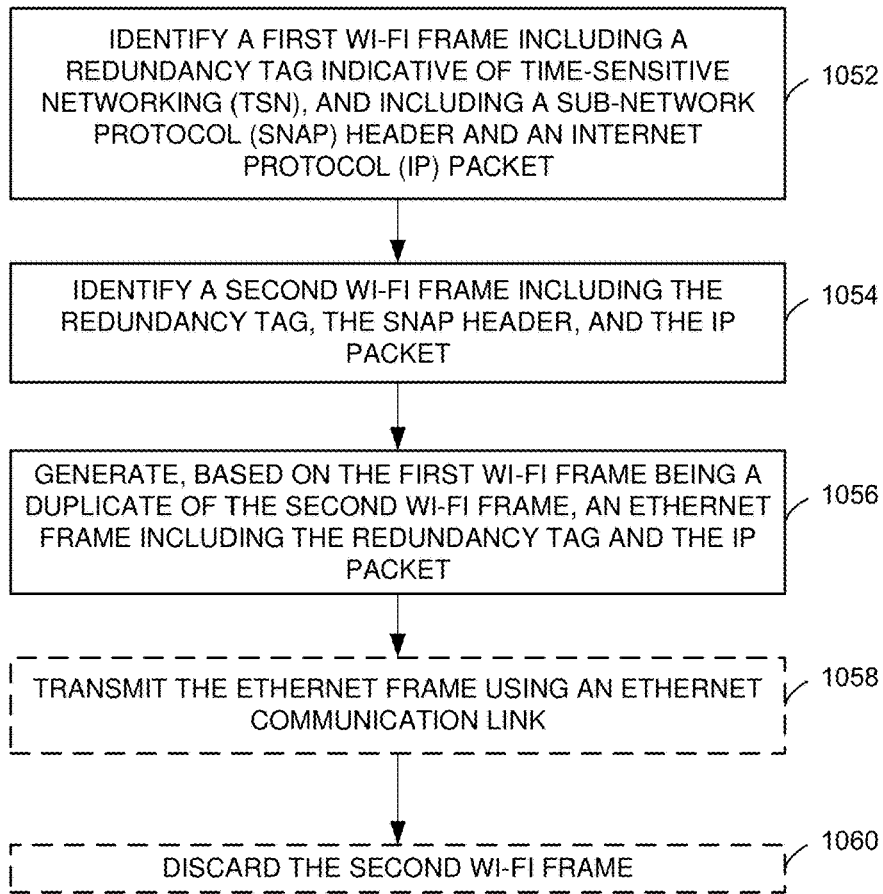
FIG. 10B illustrates a flow diagram of illustrative process for wireless time-sensitive networking redundancy operations, in accordance with one or more example embodiments of the present disclosure.

FIG. 10B illustrates a flow diagram of illustrative process 1050 for wireless time-sensitive networking redundancy operations, in accordance with one or more example embodiments of the present disclosure.

At block 1052, a device (e.g., a listener or relay device, such as shown in FIG. 3, the TSN switches of FIG. 2, the APs of FIG. 2, or the STAs/end devices of FIG. 2) may identify a first Wi-Fi frame (e.g., an 802.11 frame, such as the 802.11 frame 536 of FIG. 5). At block 1052, the device may receive a second Wi-Fi frame (e.g., a duplicate of the first Wi-Fi frame). The first and second Wi-Fi frames may be received over one or more Wi-Fi communication links as duplicates for a TSN operation. To determine that the two Wi-Fi frames are duplicates of one another, the device may decode the Wi-Fi frames as described with respect to FIGS. 8 and 10, identifying values in the same SNAP header and R-Tag that may be included in both of the Wi-Fi frames when they are duplicates for TSN redundancy. The duplicate frames may carry the same information, such as a same IP packet.

At block 1056, the device may generate an Ethernet frame that includes the same R-Tag extracted from the duplicate Wi-Fi frames, and the same information, such as the IP packet encapsulated in the Wi-Fi frames. When the device is a relay, the device may transmit the Ethernet frame over an Ethernet communication link (e.g., as shown in FIG. 3) at block 1058 (optionally). When the device is a listener, the device may discard a duplicate Wi-Fi frame at block 1060 (optionally).

It is understood that the above descriptions are for purposes of illustration and are not meant to be limiting.

FIG. 11 shows a functional diagram of an exemplary communication station 1100, in accordance with one or more example embodiments of the present disclosure. In one embodiment, FIG. 11 illustrates a functional block diagram of a communication station that may be suitable for use as an AP 102 (FIG. 1) or a user device 120 (FIG. 1) in accordance with some embodiments. The communication station 1100 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1100 may include communications circuitry 1102 and a transceiver 1110 for transmitting and receiving signals to and from other communication stations using one or more antennas 1101. The communications circuitry 1102 may include circuitry that can operate the physical layer (PHY) communications and/or medium access control (MAC) communications for controlling access to the wireless medium, and/or any other communications layers for transmitting and receiving signals. The communication station 1100 may also include processing circuitry 1106 and memory 1108 arranged to perform the operations described herein. In some embodiments, the communications circuitry 1102 and the processing circuitry 1106 may be configured to perform operations detailed in the above figures, diagrams, and flows.

In accordance with some embodiments, the communications circuitry 1102 may be arranged to contend for a wireless medium and configure frames or packets for communicating over the wireless medium. The communications circuitry 1102 may be arranged to transmit and receive signals. The communications circuitry 1102 may also include circuitry for modulation/demodulation, upconversion/downconversion, filtering, amplification, etc. In some embodiments, the processing circuitry 1106 of the communication station 1100 may include one or more processors. In other embodiments, two or more antennas 1101 may be coupled to the communications circuitry 1102 arranged for sending and receiving signals. The memory 1108 may store information for configuring the processing circuitry 1106 to perform operations for configuring and transmitting message frames and performing the various operations described herein. The memory 1108 may include any type of memory, including non-transitory memory, for storing information in a form readable by a machine (e.g., a computer). For example, the memory 1108 may include a computer-readable storage device, read-only memory (ROM), random-access memory (RAM), magnetic disk storage media, optical storage media, flash-memory devices and other storage devices and media.

In some embodiments, the communication station 1100 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1100 may include one or more antennas 1101. The antennas 1101 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1100 may include one or more of a keyboard, a display, a non-volatile memory port, multiple antennas, a graphics processor, an application processor, speakers, and other mobile device elements. The display may be an LCD screen including a touch screen.

Although the communication station 1100 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1100 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1100 may include one or more processors and may be configured with instructions stored on a computer-readable storage device.

FIG. 12 illustrates a block diagram of an example of a machine 1200 or system upon which any one or more of the techniques (e.g., methodologies) discussed herein may be performed. In other embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environments. The machine 1200 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1200 may include a hardware processor 1202 (e.g., a central processing unit (CPU), a graphics processing unit (GPU), a hardware processor core, or any combination thereof), a main memory 1204 and a static memory 1206, some or all of which may communicate with each other via an interlink (e.g., bus) 1208. The machine 1200 may further include a power management device 1232, a graphics display device 1210, an alphanumeric input device 1212 (e.g., a keyboard), and a user interface (UI) navigation device 1214 (e.g., a mouse). In an example, the graphics display device 1210, alphanumeric input device 1212, and UI navigation device 1214 may be a touch screen display. The machine 1200 may additionally include a storage device (i.e., drive unit) 1216, a signal generation device 1218 (e.g., a speaker), an enhanced redundancy device 1219, a network interface device/transceiver 1220 coupled to antenna(s) 1230, and one or more sensors 1228, such as a global positioning system (GPS) sensor, a compass, an accelerometer, or other sensor. The machine 1200 may include an output controller 1234, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 1202 for generation and processing of the baseband signals and for controlling operations of the main memory 1204, the storage device 1216, and/or the enhanced redundancy device 1219. The baseband processor may be provided on a single radio card, a single chip, or an integrated circuit (IC).

The storage device 1216 may include a machine readable medium 1222 on which is stored one or more sets of data structures or instructions 1224 (e.g., software) embodying or utilized by any one or more of the techniques or functions described herein. The instructions 1224 may also reside, completely or at least partially, within the main memory 1204, within the static memory 1206, or within the hardware processor 1202 during execution thereof by the machine 1200. In an example, one or any combination of the hardware processor 1202, the main memory 1204, the static memory 1206, or the storage device 1216 may constitute machine-readable media.

The enhanced redundancy device 1219 may carry out or perform any of the operations and processes (e.g., processes 1000 and 1050) described and shown above.

It is understood that the above are only a subset of what the enhanced redundancy device 1219 may be configured to perform and that other functions included throughout this disclosure may also be performed by the enhanced redundancy device 1219.

While the machine-readable medium 1222 is illustrated as a single medium, the term "machine-readable medium" may include a single medium or multiple media (e.g., a centralized or distributed database, and/or associated caches and servers) configured to store the one or more instructions 1224.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1200 and that cause the machine 1200 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1224 may further be transmitted or received over a communications network 1226 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1220 may include one or more physical jacks (e.g., Ethernet, coaxial, or phone jacks) or one or more antennas to connect to the communications network 1226. In an example, the network interface device/transceiver 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1200 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 13:
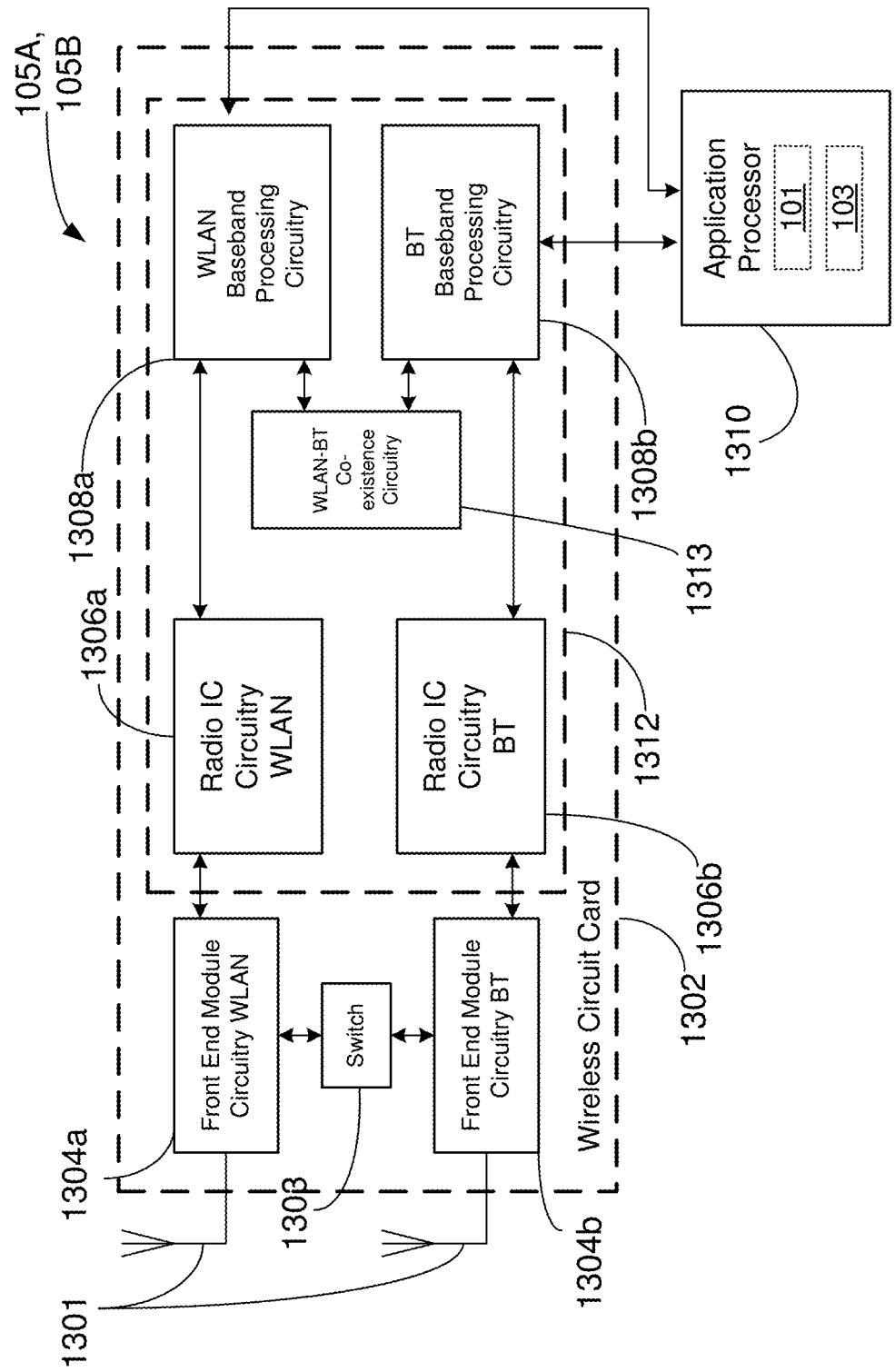
FIG. 13 is a block diagram of a radio architecture in accordance with some examples.

FIG. 13 is a block diagram of a radio architecture 105A, 105B in accordance with some embodiments that may be implemented in any one of the example APs 102 and/or the example user devices 120 of FIG. 1. Radio architecture 105A, 105B may include radio front-end module (FEM) circuitry 1304*a-b*, radio IC circuitry 1306*a-b* and baseband processing circuitry 1308*a-b*. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1304*a-b* may include a WLAN or Wi-Fi FEM circuitry 1304*a* and a Bluetooth (BT) FEM circuitry 1304*b*. The WLAN FEM circuitry 1304*a* may include a receive signal path comprising circuitry configured to operate on WLAN RF signals received from one or more antennas 1301, to amplify the received signals and to provide the amplified versions of the received signals to the WLAN radio IC circuitry 1306*a* for further processing. The BT FEM circuitry 1304*b* may include a receive signal path which may include circuitry configured to operate on BT RF signals received from one or more antennas 1301, to amplify the received signals and to provide the amplified versions of the received signals to the BT radio IC circuitry 1306*b* for further processing. FEM circuitry 1304*a* may also include a transmit signal path which may include circuitry configured to amplify WLAN signals provided by the radio IC circuitry 1306*a* for wireless transmission by one or more of the antennas 1001. In addition, FEM circuitry 1304*b* may also include a transmit signal path which may include circuitry configured to amplify BT signals provided by the radio IC circuitry 1306*b* for wireless transmission by the one or more antennas. In the embodiment of FIG. 13, although FEM 1304*a* and FEM 1304*b* are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1306*a-b* as shown may include WLAN radio IC circuitry 1306*a* and BT radio IC circuitry 1306*b*. The WLAN radio IC circuitry 1306*a* may include a receive signal path which may include circuitry to down-convert WLAN RF signals received from the FEM circuitry 1304*a* and provide baseband signals to WLAN baseband processing circuitry 1308*a*. BT radio IC circuitry 1306*b* may in turn include a receive signal path which may include circuitry to down-convert BT RF signals received from the FEM circuitry 1304*b* and provide baseband signals to BT baseband processing circuitry 1308*b*. WLAN radio IC circuitry 1306*a* may also include a transmit signal path which may include circuitry to up-convert WLAN baseband signals provided by the WLAN baseband processing circuitry 1308*a* and provide WLAN RF output signals to the FEM circuitry 1304*a* for subsequent wireless transmission by the one or more antennas 1301. BT radio IC circuitry 1306*b* may also include a transmit signal path which may include circuitry to up-convert BT baseband signals provided by the BT baseband processing circuitry 1008*b* and provide BT RF output signals to the FEM circuitry 1304*b* for subsequent wireless transmission by the one or more antennas 1301. In the embodiment of FIG. 13, although radio IC circuitries 1306*a* and 1306*b* are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 1308*a-b* may include a WLAN baseband processing circuitry 1308*a* and a BT baseband processing circuitry 1308*b*. The WLAN baseband processing circuitry 1308*a* may include a memory, such as, for example, a set of RAM arrays in a Fast Fourier Transform or Inverse Fast Fourier Transform block (not shown) of the WLAN baseband processing circuitry 1308*a*. Each of the WLAN baseband circuitry 1308*a* and the BT baseband circuitry 1308*b* may further include one or more processors and control logic to process the signals received from the corresponding WLAN or BT receive signal path of the radio IC circuitry 1306*a-b*, and to also generate corresponding WLAN or BT baseband signals for the transmit signal path of the radio IC circuitry 1306*a-b*. Each of the baseband processing circuitries 1308*a* and 1308*b* may further include physical layer (PHY) and medium access control layer (MAC) circuitry, and may further interface with a device for generation and processing of the baseband signals and for controlling operations of the radio IC circuitry 1306*a-b*.

Referring still to FIG. 13, according to the shown embodiment, WLAN-BT coexistence circuitry 1313 may include logic providing an interface between the WLAN baseband circuitry 1308*a* and the BT baseband circuitry 1308*b* to enable use cases requiring WLAN and BT coexistence. In addition, a switch 1303 may be provided between the WLAN FEM circuitry 1304*a* and the BT FEM circuitry 1304*b* to allow switching between the WLAN and BT radios according to application needs. In addition, although the antennas 1301 are depicted as being respectively connected to the WLAN FEM circuitry 1304*a* and the BT FEM circuitry 1304*b*, embodiments include within their scope the sharing of one or more antennas as between the WLAN and BT FEMs, or the provision of more than one antenna connected to each of FEM 1304*a* or 1304*b*.

In some embodiments, the front-end module circuitry 1304*a-b*, the radio IC circuitry 1006*a-b*, and baseband processing circuitry 1308*a-b* may be provided on a single radio card, such as wireless radio card 1302. In some other embodiments, the one or more antennas 1301, the FEM circuitry 1304*a-b* and the radio IC circuitry 1306*a-b* may be provided on a single radio card. In some other embodiments, the radio IC circuitry 1306*a-b* and the baseband processing circuitry 1008*a-b* may be provided on a single chip or integrated circuit (IC), such as IC 1312.

In some embodiments, the wireless radio card 1302 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 13, the BT baseband circuitry 1308*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 14:
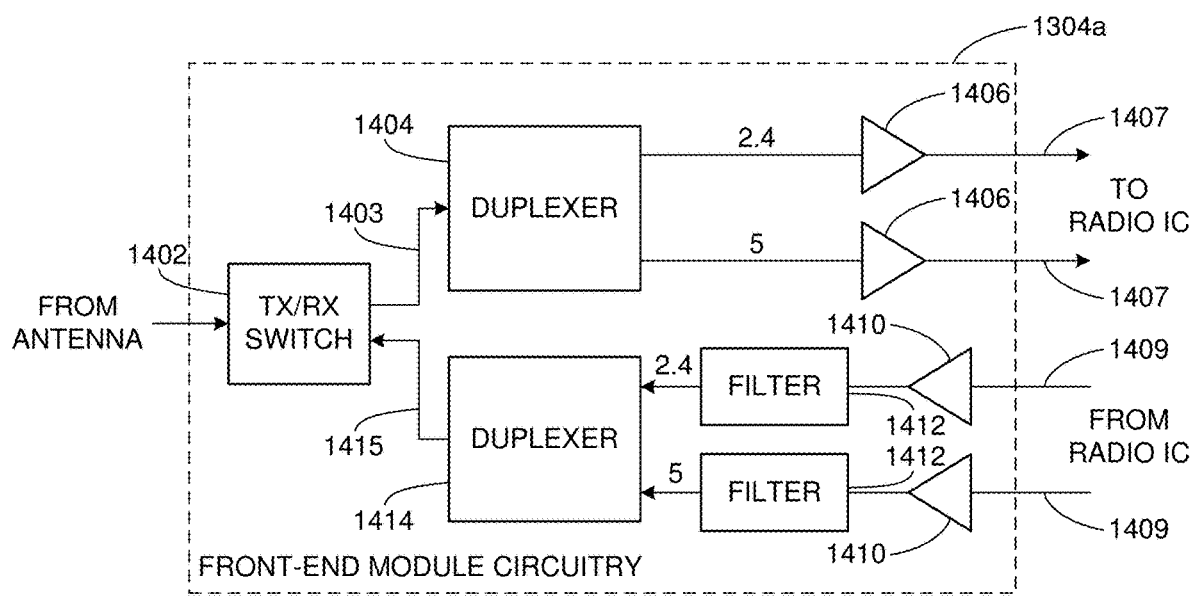
FIG. 14 illustrates an example front-end module circuitry for use in the radio architecture of FIG. 13, in accordance with one or more example embodiments of the present disclosure.

FIG. 14 illustrates WLAN FEM circuitry 1404*a* in accordance with some embodiments. Although the example of FIG. 14 is described in conjunction with the WLAN FEM circuitry 1304*a*, the example of FIG. 14 may be described in conjunction with the example BT FEM circuitry 1304*b* (FIG. 13), although other circuitry configurations may also be suitable.

In some embodiments, the FEM circuitry 1304*a* may include a TX/RX switch 1402 to switch between transmit mode and receive mode operation. The FEM circuitry 1304*a* may include a receive signal path and a transmit signal path. The receive signal path of the FEM circuitry 1304*a* may include a low-noise amplifier (LNA) 1406 to amplify received RF signals 1403 and provide the amplified received RF signals 1407 as an output (e.g., to the radio IC circuitry 1306*a-b* (FIG. 13)). The transmit signal path of the circuitry 1304*a* may include a power amplifier (PA) to amplify input RF signals 1409 (e.g., provided by the radio IC circuitry 1306*a-b*), and one or more filters 1412, such as band-pass filters (BPFs), low-pass filters (LPFs) or other types of filters, to generate RF signals 1415 for subsequent transmission (e.g., by one or more of the antennas 1301 (FIG. 13)) via an example duplexer 1414.

In some dual-mode embodiments for Wi-Fi communication, the FEM circuitry 1304*a* may be configured to operate in either the 2.4 GHz frequency spectrum or the 5 GHz frequency spectrum. In these embodiments, the receive signal path of the FEM circuitry 1304*a* may include a receive signal path duplexer 1404 to separate the signals from each spectrum as well as provide a separate LNA 1406 for each spectrum as shown. In these embodiments, the transmit signal path of the FEM circuitry 1404*a* may also include a power amplifier 1410 and a filter 1412, such as a BPF, an LPF or another type of filter for each frequency spectrum and a transmit signal path duplexer 1104 to provide the signals of one of the different spectrums onto a single transmit path for subsequent transmission by the one or more of the antennas 1301 (FIG. 13). In some embodiments, BT communications may utilize the 2.4 GHz signal paths and may utilize the same FEM circuitry 1304*a* as the one used for WLAN communications.

Figure 15:
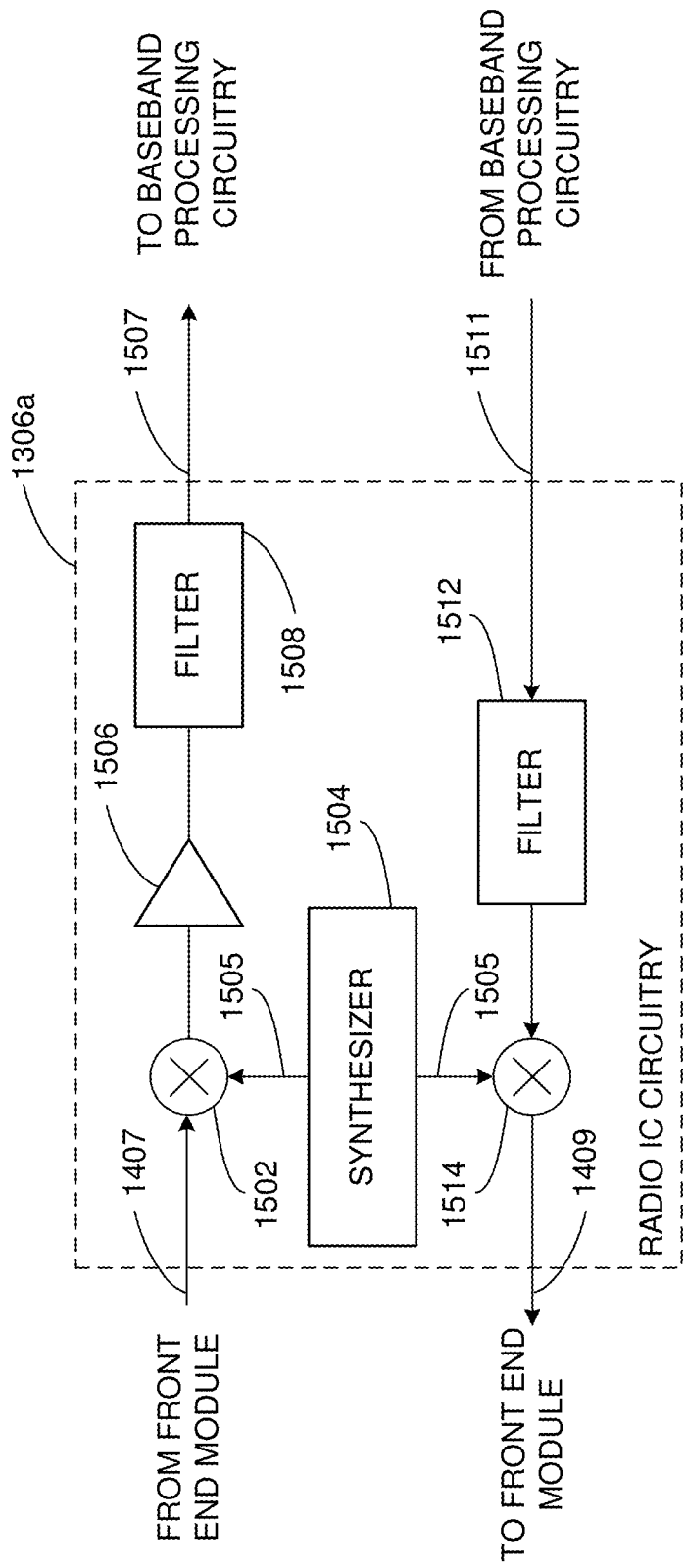
FIG. 15 illustrates an example radio IC circuitry for use in the radio architecture of FIG. 13, in accordance with one or more example embodiments of the present disclosure.

FIG. 15 illustrates radio IC circuitry 1306*a* in accordance with some embodiments. The radio IC circuitry 1306*a* is one example of circuitry that may be suitable for use as the WLAN or BT radio IC circuitry 1306*a*/1306*b* (FIG. 13), although other circuitry configurations may also be suitable. Alternatively, the example of FIG. 15 may be described in conjunction with the example BT radio IC circuitry 1306*b*.

In some embodiments, the radio IC circuitry 1306*a* may include a receive signal path and a transmit signal path. The receive signal path of the radio IC circuitry 1306*a* may include at least mixer circuitry 1502, such as, for example, down-conversion mixer circuitry, amplifier circuitry 1506 and filter circuitry 1508. The transmit signal path of the radio IC circuitry 1306*a* may include at least filter circuitry 1512 and mixer circuitry 1514, such as, for example, upconversion mixer circuitry. Radio IC circuitry 1306*a* may also include synthesizer circuitry 1504 for synthesizing a frequency 1505 for use by the mixer circuitry 1502 and the mixer circuitry 1514. The mixer circuitry 1502 and/or 1514 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 15 illustrates only a simplified version of a radio IC circuitry, and may include, although not shown, embodiments where each of the depicted circuitries may include more than one component. For instance, mixer circuitry 1514 may each include one or more mixers, and filter circuitries 1508 and/or 1512 may each include one or more filters, such as one or more BPFs and/or LPFs according to application needs. For example, when mixer circuitries are of the direct-conversion type, they may each include two or more mixers.

In some embodiments, mixer circuitry 1502 may be configured to down-convert RF signals 1407 received from the FEM circuitry 1304a-b (FIG. 13) based on the synthesized frequency 1505 provided by synthesizer circuitry 1504. The amplifier circuitry 1506 may be configured to amplify the down-converted signals and the filter circuitry 1508 may include an LPF configured to remove unwanted signals from the down-converted signals to generate output baseband signals 1507. Output baseband signals 1507 may be provided to the baseband processing circuitry 1308a-b (FIG. 13) for further processing. In some embodiments, the output baseband signals 1507 may be zero-frequency baseband signals, although this is not a requirement. In some embodiments, mixer circuitry 1502 may comprise passive mixers, although the scope of the embodiments is not limited in this respect.

In some embodiments, the mixer circuitry 1514 may be configured to up-convert input baseband signals 1511 based on the synthesized frequency 1505 provided by the synthesizer circuitry 1504 to generate RF output signals 1509 for the FEM circuitry 1304a-b. The baseband signals 1511 may be provided by the baseband processing circuitry 1308a-b and may be filtered by filter circuitry 1512. The filter circuitry 1512 may include an LPF or a BPF, although the scope of the embodiments is not limited in this respect.

In some embodiments, the mixer circuitry 1502 and the mixer circuitry 1514 may each include two or more mixers and may be arranged for quadrature down-conversion and/or upconversion respectively with the help of synthesizer 1504. In some embodiments, the mixer circuitry 1502 and the mixer circuitry 1514 may each include two or more mixers each configured for image rejection (e.g., Hartley image rejection). In some embodiments, the mixer circuitry 1502 and the mixer circuitry 1514 may be arranged for direct down-conversion and/or direct upconversion, respectively. In some embodiments, the mixer circuitry 1502 and the mixer circuitry 1514 may be configured for super-heterodyne operation, although this is not a requirement.

Mixer circuitry 1502 may comprise, according to one embodiment: quadrature passive mixers (e.g., for the in-phase (I) and quadrature phase (Q) paths). In such an embodiment, RF input signal 1407 from FIG. 14 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1505 of synthesizer 1504 (FIG. 15). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1407 (FIG. 14) may comprise a balanced signal, although the scope of the embodiments is not limited in this respect. The I and Q baseband output signals may be provided to low-noise amplifier, such as amplifier circuitry 1506 (FIG. 15) or to filter circuitry 1508 (FIG. 15).

In some embodiments, the output baseband signals 1507 and the input baseband signals 1211 may be analog baseband signals, although the scope of the embodiments is not limited in this respect. In some alternate embodiments, the output baseband signals 1507 and the input baseband signals 1511 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1504 may be a fractional-N synthesizer or a fractional N/N+1 synthesizer, although the scope of the embodiments is not limited in this respect as other types of frequency synthesizers may be suitable. For example, synthesizer circuitry 1504 may be a delta-sigma synthesizer, a frequency multiplier, or a synthesizer comprising a phase-locked loop with a frequency divider. According to some embodiments, the synthesizer circuitry 1504 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 1504 may be provided by a voltage controlled oscillator (VCO), although that is not a requirement. A divider control input may further be provided by either the baseband processing circuitry 1308a-b (FIG. 13) depending on the desired output frequency 1505. In some embodiments, a divider control input (e.g., N) may be determined from a look-up table (e.g., within a Wi-Fi card) based on a channel number and a channel center frequency as determined or indicated by the example application processor 1310. The application processor 1310 may include, or otherwise be connected to, one of the example secure signal converter 101 or the example received signal converter 103 (e.g., depending on which device the example radio architecture is implemented in).

In some embodiments, synthesizer circuitry 1504 may be configured to generate a carrier frequency as the output frequency 1505, while in other embodiments, the output frequency 1505 may be a fraction of the carrier frequency (e.g., one-half the carrier frequency, one-third the carrier frequency). In some embodiments, the output frequency 1505 may be a LO frequency (fLO).

Figure 16:
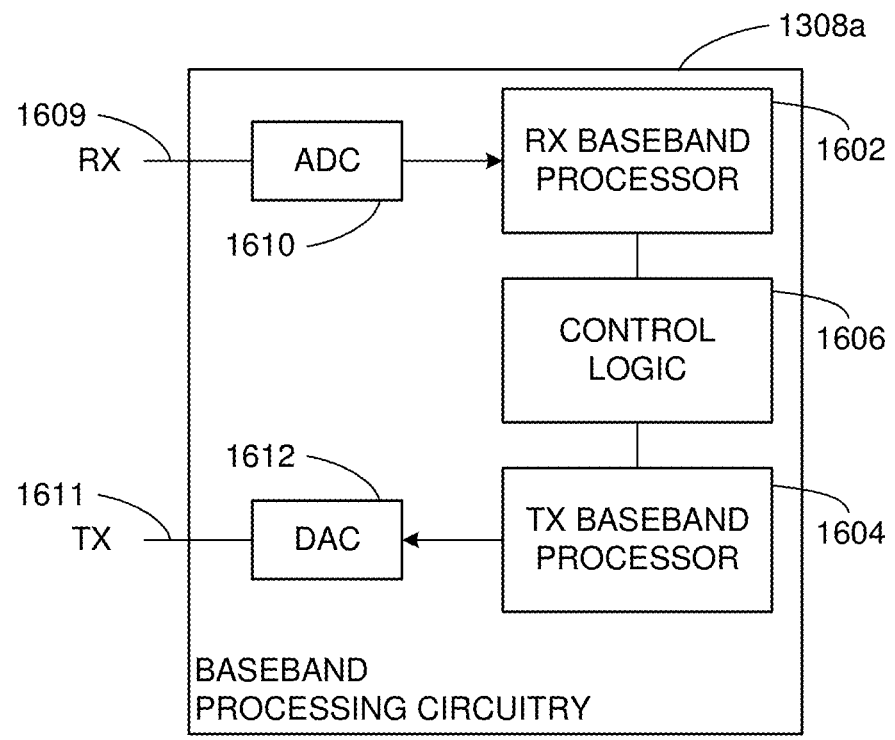
FIG. 16 illustrates an example baseband processing circuitry for use in the radio architecture of FIG. 13, in accordance with one or more example embodiments of the present disclosure.

FIG. 16 illustrates a functional block diagram of baseband processing circuitry 1308*a* in accordance with some embodiments. The baseband processing circuitry 1308*a* is one example of circuitry that may be suitable for use as the baseband processing circuitry 1308*a* (FIG. 13), although other circuitry configurations may also be suitable. Alternatively, the example of FIG. 15 may be used to implement the example BT baseband processing circuitry 1308*b* of FIG. 13.

The baseband processing circuitry 1308*a* may include a receive baseband processor (RX BBP) 1602 for processing receive baseband signals 1409 provided by the radio IC circuitry 1306*a-b* (FIG. 13) and a transmit baseband processor (TX BBP) 1604 for generating transmit baseband signals 1511 for the radio IC circuitry 1306*a-b*. The baseband processing circuitry 1308*a* may also include control logic 1606 for coordinating the operations of the baseband processing circuitry 1308*a*.

In some embodiments (e.g., when analog baseband signals are exchanged between the baseband processing circuitry 1308*a-b* and the radio IC circuitry 1306*a-b*), the baseband processing circuitry 1308*a* may include ADC 1610 to convert analog baseband signals 1609 received from the radio IC circuitry 1306*a-b* to digital baseband signals for processing by the RX BBP 1602. In these embodiments, the baseband processing circuitry 1308*a* may also include DAC 1612 to convert digital baseband signals from the TX BBP 1604 to analog baseband signals 1611.

In some embodiments that communicate OFDM signals or OFDMA signals, such as through baseband processor 1308*a*, the transmit baseband processor 1604 may be configured to generate OFDM or OFDMA signals as appropriate for transmission by performing an inverse fast Fourier transform (IFFT). The receive baseband processor 1602 may be configured to process received OFDM signals or OFDMA signals by performing an FFT. In some embodiments, the receive baseband processor 1602 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 13, in some embodiments, the antennas 1301 (FIG. 13) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1301 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Example 1 may be an apparatus of a device for using redundant frames for time-sensitive networking (TSN), the apparatus comprising memory and processing circuitry configured to: identify an Ethernet frame comprising a redundancy tag and an Internet Protocol (IP) packet, the redundancy tag associated with the TSN; generate, based on the Ethernet frame, a first Wi-Fi frame comprising the redundancy tag and a sub-network access protocol (SNAP) header after an 802.11 medium access control (MAC) header and prior to the redundancy tag, the first Wi-Fi frame further comprising a first encapsulation of the IP packet; generate, based on the Ethernet frame, a second Wi-Fi frame comprising the redundancy tag and the SNAP header after the 802.11 MAC header and prior to the redundancy tag, the second Wi-Fi frame further comprising a second encapsulation of the IP packet; transmit the first Wi-Fi frame using a first Wi-Fi communication link; and transmit the second Wi-Fi frame using a second Wi-Fi communication link.

Example 2 may include the apparatus of example 1 and/or some other example herein, wherein the device is a talker device, and wherein the talker device generates the Ethernet frame.

Example 3 may include the apparatus of example 1 and/or some other example herein, wherein the device is a relay device, and wherein the relay device receives the Ethernet frame from a second device using an Ethernet communication link.

Example 4 may include the apparatus of example 1 and/or some other example herein, wherein the processing circuitry is further configured to: generate a sequence number indicative of a duplicate transmission associated with the TSN, wherein the redundancy tag comprises the sequence number.

Example 5 may include the apparatus of example 1 and/or some other example herein, wherein the processing circuitry is further configured to: generate a reserved field consisting of only zero values, wherein the redundancy tag comprises the reserved field.

Example 6 may include the apparatus of example 1 and/or some other example herein, wherein the first encapsulation is performed by a first MAC layer of the device, and wherein the second encapsulation is performed by a second MAC layer of the device.

Example 7 may include the apparatus of example 6 and/or some other example herein, wherein the first Wi-Fi frame further comprises a first virtual local area network (VLAN) identifier, and wherein the second Wi-Fi frame further comprises a second VLAN identifier different than the first VLAN identifier.

Example 8 may include the apparatus of example 1 and/or some other example herein, wherein the processing circuitry is further configured to: determine that the Ethernet frame further comprises an EtherType indication, wherein the first Wi-Fi frame and the second Wi-Fi frame comprise the SNAP header and the redundancy tag based on the determination that the Ethernet frame comprises the EtherType indication.

Example 9 may include the apparatus of example 1 and/or some other example herein, further comprising a transceiver configured to transmit and receive wireless signals comprising the first Wi-Fi frame and the second Wi-Fi frame.

Example 10 may include the device of example 9 and/or some other example herein, further comprising one or more antennas coupled to the transceiver to transmit the first Wi-Fi frame and the second Wi-Fi frame.

Example 11 may include a non-transitory computer-readable medium storing computer-executable instructions which when executed by one or more processors result in performing operations comprising: identifying, by a device, a first Wi-Fi frame comprising a redundancy tag and a sub-network access protocol (SNAP) header after an 802.11 medium access control (MAC) header and prior to the redundancy tag, the first Wi-Fi frame further comprising a first encapsulation of an Internet Protocol (IP) packet; identifying, by the device, a second Wi-Fi frame comprising the redundancy tag and the SNAP header after the 802.11 MAC header and prior to the redundancy tag, the second Wi-Fi frame further comprising a second encapsulation of the IP Packet, and the redundancy tag associated with time-sensitive networking; and generating, by the device, based on the first Wi-Fi frame, an Ethernet frame comprising the redundancy tag and the IP packet.

Example 12 may include the non-transitory computer-readable medium of example 11 and/or some other example herein, wherein the device is a relay device, wherein the relay device receives the first Wi-Fi frame using a first Wi-Fi communication link, and wherein the relay device receives the second Wi-Fi frame using a second Wi-Fi communication link, the operations further comprising: determining, by the relay device, based on the redundancy tag, that the second Wi-Fi frame is a duplicate of the first Wi-Fi frame; discarding, by the relay device, the second Wi-Fi frame based on the determination that the second Wi-Fi frame is a duplicate of the first Wi-Fi frame; and transmitting, by the relay device, the Ethernet frame with the redundancy tag using an Ethernet communication link.

Example 13 may include the non-transitory computer-readable medium of example 11 and/or some other example herein, wherein the device is a listener device, wherein the listener device receives the first Wi-Fi frame using a first Wi-Fi communication link, and wherein the listener device receives the second Wi-Fi frame using a second Wi-Fi communication link, the operations further comprising: determining, by the listener device, based on the redundancy tag, that the second Wi-Fi frame is a duplicate of the first Wi-Fi frame; and discarding, by the listener device, the second Wi-Fi frame based on the determination that the second Wi-Fi frame is a duplicate of the first Wi-Fi frame.

Example 14 may include the non-transitory computer-readable medium of example 11 and/or some other example herein, the operations further comprising: determining, by the device, that the SNAP header comprises a first value of AA or AB; determining, by the device, that the SNAP header further comprises a second value of 000000; and determining, by the device, that the first Wi-Fi frame comprises an EtherType indication, wherein the Ethernet frame comprises the redundancy tag based on the first value, the second value, and the EtherType indication.

Example 15 may include a method for using redundant frames for time-sensitive networking (TSN), the method comprising: identifying, by processing circuitry of a device, an Ethernet frame comprising a redundancy tag and an Internet Protocol (IP) packet, the redundancy tag associated with the TSN; generating, by the processing circuitry, based on the Ethernet frame, a first Wi-Fi frame comprising the redundancy tag and a sub-network access protocol (SNAP) header after an 802.11 medium access control (MAC) header and prior to the redundancy tag, the first Wi-Fi frame further comprising a first encapsulation of the IP packet; generating, by the processing circuitry, based on the Ethernet frame, a second Wi-Fi frame comprising the redundancy tag and the SNAP header after the 802.11 MAC header and prior to the redundancy tag, the second Wi-Fi frame further comprising a second encapsulation of the IP packet; transmitting, by the processing circuitry, the first Wi-Fi frame using a first Wi-Fi communication link; and transmitting, by the processing circuitry, the second Wi-Fi frame using a second Wi-Fi communication link.

Example 16 may include the method of example 15 and/or some other example herein, wherein the device is a talker device, and wherein the talker device generates the Ethernet frame.

Example 17 may include the method of example 15 and/or some other example herein, wherein the device is a relay device, and wherein the relay device receives the Ethernet frame from a second device using an Ethernet communication link.

Example 18 may include the method of example 15 and/or some other example herein, further comprising: generating a sequence number indicative of a duplicate transmission associated with the TSN, wherein the redundancy tag comprises the sequence number.

Example 19 may include the method of example 15 and/or some other example herein, further comprising: generating a reserved field consisting of only zero values, wherein the redundancy tag comprises the reserved field.

Example 20 may include the method of example 15 and/or some other example herein, wherein the first encapsulation is performed by a first MAC layer of the device, wherein the second encapsulation is performed by a second MAC layer of the device, wherein the first Wi-Fi frame further comprises a first virtual local area network (VLAN) identifier, and wherein the second Wi-Fi frame further comprises a second VLAN identifier different than the first VLAN identifier.

Example 21 may include an apparatus comprising means for: identifying an Ethernet frame comprising a redundancy tag and an Internet Protocol (IP) packet, the redundancy tag associated with the TSN; generating, based on the Ethernet frame, a first Wi-Fi frame comprising the redundancy tag and a sub-network access protocol (SNAP) header after an 802.11 medium access control (MAC) header and prior to the redundancy tag, the first Wi-Fi frame further comprising a first encapsulation of the IP packet; generating, based on the Ethernet frame, a second Wi-Fi frame comprising the redundancy tag and the SNAP header after the 802.11 MAC header and prior to the redundancy tag, the second Wi-Fi frame further comprising a second encapsulation of the IP packet; transmitting the first Wi-Fi frame using a first Wi-Fi communication link; and transmitting the second Wi-Fi frame using a second Wi-Fi communication link.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-21, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 26 may include a method of communicating in a wireless network as shown and described herein.

Example 27 may include a system for providing wireless communication as shown and described herein.

Example 28 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. An apparatus of a device for using redundant frames for time-sensitive networking (TSN), the apparatus comprising processing circuitry coupled to storage, the processing circuitry configured to:
   identify an Ethernet frame comprising a redundancy tag and an Internet Protocol (IP) packet, the redundancy tag associated with the TSN;
   generate, based on the Ethernet frame, a first Wi-Fi frame comprising the redundancy tag and a sub-network access protocol (SNAP) header after an 802.11 medium access control (MAC) header and prior to the redundancy tag, the first Wi-Fi frame further comprising a first encapsulation of the IP packet;
   generate, based on the Ethernet frame, a second Wi-Fi frame comprising the redundancy tag and the SNAP header after the 802.11 MAC header and prior to the redundancy tag, the second Wi-Fi frame further comprising a second encapsulation of the IP packet;
   transmit the first Wi-Fi frame using a first Wi-Fi communication link; and
   transmit the second Wi-Fi frame using a second Wi-Fi communication link.

2. The apparatus of claim 1, wherein the device is a talker device, and wherein the talker device generates the Ethernet frame.

3. The apparatus of claim 1, wherein the device is a relay device, and wherein the relay device receives the Ethernet frame from a second device using an Ethernet communication link.

4. The apparatus of claim 1, wherein the processing circuitry is further configured to:
   generate a sequence number indicative of a duplicate transmission associated with the TSN,
   wherein the redundancy tag comprises the sequence number.

5. The apparatus of claim 1, wherein the processing circuitry is further configured to:
   generate a reserved field consisting of only zero values,
   wherein the redundancy tag comprises the reserved field.

6. The apparatus of claim 1, wherein the first encapsulation is performed by a first MAC layer of the device, and wherein the second encapsulation is performed by a second MAC layer of the device.

7. The apparatus of claim 6, wherein the first Wi-Fi frame further comprises a first virtual local area network (VLAN) identifier, and wherein the second Wi-Fi frame further comprises a second VLAN identifier different than the first VLAN identifier.

8. The apparatus of claim 1, wherein the processing circuitry is further configured to:
determine that the Ethernet frame further comprises an EtherType indication,
wherein the first Wi-Fi frame and the second Wi-Fi frame comprise the SNAP header and the redundancy tag based on the determination that the Ethernet frame comprises the EtherType indication.

9. The apparatus of claim 1, further comprising a transceiver configured to transmit and receive wireless signals comprising the first Wi-Fi frame and the second Wi-Fi frame.

10. The apparatus of claim 9, further comprising an antenna coupled to the transceiver to transmit the first Wi-Fi frame and the second Wi-Fi frame.

11. A non-transitory computer-readable medium storing computer-executable instructions which when executed by one or more processors result in performing operations comprising:
identifying, by a device, a first Wi-Fi frame comprising a redundancy tag and a sub-network access protocol (SNAP) header after an 802.11 medium access control (MAC) header and prior to the redundancy tag, the first Wi-Fi frame further comprising a first encapsulation of an Internet Protocol (IP) packet;
identifying, by the device, a second Wi-Fi frame comprising the redundancy tag and the SNAP header after the 802.11 MAC header and prior to the redundancy tag, the second Wi-Fi frame further comprising a second encapsulation of the IP Packet, and the redundancy tag associated with time-sensitive networking; and
generating, by the device, based on the first Wi-Fi frame, an Ethernet frame comprising the redundancy tag and the IP packet.

12. The non-transitory computer-readable medium of claim 11, wherein the device is a relay device, wherein the relay device receives the first Wi-Fi frame using a first Wi-Fi communication link, and wherein the relay device receives the second Wi-Fi frame using a second Wi-Fi communication link, the operations further comprising:
determining, by the relay device, based on the redundancy tag, that the second Wi-Fi frame is a duplicate of the first Wi-Fi frame;
discarding, by the relay device, the second Wi-Fi frame based on the determination that the second Wi-Fi frame is a duplicate of the first Wi-Fi frame; and
transmitting, by the relay device, the Ethernet frame with the redundancy tag using an Ethernet communication link.

13. The non-transitory computer-readable medium of claim 11, wherein the device is a listener device, wherein the listener device receives the first Wi-Fi frame using a first Wi-Fi communication link, and wherein the listener device receives the second Wi-Fi frame using a second Wi-Fi communication link, the operations further comprising:
determining, by the listener device, based on the redundancy tag, that the second Wi-Fi frame is a duplicate of the first Wi-Fi frame; and
discarding, by the listener device, the second Wi-Fi frame based on the determination that the second Wi-Fi frame is a duplicate of the first Wi-Fi frame.

14. The non-transitory computer-readable medium of claim 11, the operations further comprising:
determining, by the device, that the SNAP header comprises a first value of AA or AB;
determining, by the device, that the SNAP header further comprises a second value of 000000; and
determining, by the device, that the first Wi-Fi frame comprises an EtherType indication,
wherein the Ethernet frame comprises the redundancy tag based on the first value, the second value, and the EtherType indication.

15. A method for using redundant frames for time-sensitive networking (TSN), the method comprising:
identifying, by processing circuitry of a device, an Ethernet frame comprising a redundancy tag and an Internet Protocol (IP) packet, the redundancy tag associated with the TSN;
generating, by the processing circuitry, based on the Ethernet frame, a first Wi-Fi frame comprising the redundancy tag and a sub-network access protocol (SNAP) header after an 802.11 medium access control (MAC) header and prior to the redundancy tag, the first Wi-Fi frame further comprising a first encapsulation of the IP packet;
generating, by the processing circuitry, based on the Ethernet frame, a second Wi-Fi frame comprising the redundancy tag and the SNAP header after the 802.11 MAC header and prior to the redundancy tag, the second Wi-Fi frame further comprising a second encapsulation of the IP packet;
transmitting, by the processing circuitry, the first Wi-Fi frame using a first Wi-Fi communication link; and
transmitting, by the processing circuitry, the second Wi-Fi frame using a second Wi-Fi communication link.

16. The method of claim 15, wherein the device is a talker device, and wherein the talker device generates the Ethernet frame.

17. The method of claim 15, wherein the device is a relay device, and wherein the relay device receives the Ethernet frame from a second device using an Ethernet communication link.

18. The method of claim 15, further comprising:
generating a sequence number indicative of a duplicate transmission associated with the TSN,
wherein the redundancy tag comprises the sequence number.

19. The method of claim 15, further comprising:
generating a reserved field consisting of only zero values, wherein the redundancy tag comprises the reserved field.

20. The method of claim 15, wherein the first encapsulation is performed by a first MAC layer of the device, wherein the second encapsulation is performed by a second MAC layer of the device, wherein the first Wi-Fi frame further comprises a first virtual local area network (VLAN) identifier, and wherein the second Wi-Fi frame further comprises a second VLAN identifier different than the first VLAN identifier.

* * * * *